United States Patent
Peng et al.

(10) Patent No.: US 9,832,776 B2
(45) Date of Patent: Nov. 28, 2017

(54) METHOD, NETWORK DEVICE, AND SYSTEM FOR TRANSMIT POWER CONTROL DURING DEVICE TO-DEVICE COMMUNICATION

(71) Applicant: China Academy of Telecommunications Technology, Beijing (CN)

(72) Inventors: Ying Peng, Beijing (CN); Qiubin Gao, Beijing (CN); Wenhong Chen, Beijing (CN); Rui Zhao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 38 days.

(21) Appl. No.: 14/782,029

(22) PCT Filed: Apr. 2, 2014

(86) PCT No.: PCT/CN2014/074616
§ 371 (c)(1),
(2) Date: Oct. 2, 2015

(87) PCT Pub. No.: WO2014/161485
PCT Pub. Date: Oct. 9, 2014

(65) Prior Publication Data
US 2016/0037530 A1 Feb. 4, 2016

(30) Foreign Application Priority Data
Apr. 3, 2013 (CN) .......................... 2013 1 0116181

(51) Int. Cl.
*H04W 72/04* (2009.01)
*H04W 52/04* (2009.01)
(Continued)

(52) U.S. Cl.
CPC ...... *H04W 72/0473* (2013.01); *H04B 17/345* (2015.01); *H04B 17/382* (2015.01);
(Continued)

(58) Field of Classification Search
CPC ............. H04W 76/023; H04W 72/082; H04W 52/383; H04W 8/005; H04W 72/042;
(Continued)

(56) References Cited

U.S. PATENT DOCUMENTS

2010/0261469 A1* 10/2010 Ribeiro ................. H04W 99/00
455/423
2012/0314600 A1 12/2012 Zeira
(Continued)

FOREIGN PATENT DOCUMENTS

| CN | 1296345 | 5/2001 |
|---|---|---|
| CN | 102404837 | 4/2012 |

(Continued)

OTHER PUBLICATIONS

International Search Report for PCT/CN2014/074616 dated Jul. 1, 2014.
(Continued)

*Primary Examiner* — Melanie Jagannathan
*Assistant Examiner* — Najeebuddin Ansari
(74) *Attorney, Agent, or Firm* — Foley & Lardner LLP

(57) ABSTRACT

Disclosed are a method, network device, and system for transmit power control during D2D communication. The method comprises: a network device determines the maximum allowed transmit power of a first terminal on the basis of the maximum level of interference that a cellular network can handle and/or the maximum level of interference that the first terminal is allowed to cause to a receiving terminal, and sends said maximum allowed transmit power of the first terminal to the first terminal, said first terminal being the
(Continued)

sending device of D2D communication; and the first terminal determines transmit power on the basis of said maximum allowed transmit power. By means of the present technical solutions, when determining transmit power, a D2D sending device takes into account the maximum interference a cellular network can handle and/or the maximum level of interference that may be caused to a receiving terminal, thereby reducing the interference caused to D2D communicating terminals or to terminals of other cells using the resources of a cellular network.

18 Claims, 4 Drawing Sheets

(51) Int. Cl.

| | | |
|---|---|---|
| *H04W 52/24* | (2009.01) | |
| *H04W 52/36* | (2009.01) | |
| *H04W 52/38* | (2009.01) | |
| *H04W 76/02* | (2009.01) | |
| *H04B 17/345* | (2015.01) | |
| *H04B 17/382* | (2015.01) | |
| *H04W 24/06* | (2009.01) | |
| *H04W 72/08* | (2009.01) | |
| *H04W 52/08* | (2009.01) | |

(52) U.S. Cl.
CPC .......... *H04W 24/06* (2013.01); *H04W 52/04* (2013.01); *H04W 52/243* (2013.01); *H04W 52/244* (2013.01); *H04W 52/365* (2013.01); *H04W 52/367* (2013.01); *H04W 52/383* (2013.01); *H04W 72/082* (2013.01); *H04W 76/023* (2013.01); *H04W 52/08* (2013.01); *H04W 52/241* (2013.01); *H04W 52/242* (2013.01); *H04W 52/245* (2013.01); *H04W 52/362* (2013.01); *H04W 52/386* (2013.01)

(58) Field of Classification Search
CPC . H04W 52/243; H04W 24/02; H04W 52/367; H04W 52/242; H04W 72/0413; H04W 88/02; H04W 72/0473; H04W 52/08
See application file for complete search history.

(56) References Cited

U.S. PATENT DOCUMENTS

| | | | | |
|---|---|---|---|---|
| 2014/0349659 | A1* | 11/2014 | Ishii | H04W 8/082 455/444 |
| 2015/0173088 | A1* | 6/2015 | Kim | H04W 76/023 370/329 |
| 2015/0296443 | A1* | 10/2015 | Lim | H04W 48/12 370/312 |
| 2015/0319796 | A1* | 11/2015 | Lu | H04B 7/2615 370/330 |
| 2015/0382306 | A1* | 12/2015 | Lee | H04W 52/243 455/501 |
| 2015/0382365 | A1* | 12/2015 | Li | H04L 5/0085 370/329 |

FOREIGN PATENT DOCUMENTS

| | | |
|---|---|---|
| CN | 102833760 | 12/2012 |
| WO | WO-2012/171386 A1 | 12/2012 |

OTHER PUBLICATIONS

Extended European Search Report for EP Application No. 14779259.2 dated Dec. 3, 2015.
Doppler K et al: "Device-to-Device Communications; Functional Prospects for LTE-Advanced Networks", Communications Workshops, 2009. ICC Workshops 2009. IEEE International Conference on, IEEE, Piscataway, NJ, USA, Jun. 14, 2009 (Jun. 14, 2009), pp. 1-6, XP031515460, ISBN: 978-1-4244-3437-4.
Pekka Janis et al: "Device-to-Device Communication Underlaying Cellular Communications Systems", Int'l J. of Communications, Network and System Sciences, vol. 02, No. 03, Jan. 1, 2009 (Jan. 1, 2009), pp. 169-178, XP055068717, ISSN: 1913-3715, DOI:10. 4236/ijcns.2009.23019.

* cited by examiner

METHOD, NETWORK DEVICE, AND SYSTEM FOR TRANSMIT POWER CONTROL DURING DEVICE TO-DEVICE COMMUNICATION

This application is a US National Stage of International Application No. PCT/CN2014/074616, filed on Apr. 2, 2014, designating the United States and claiming the benefit of Chinese Patent Application No. 201310116181.X, filed with the State Intellectual Property Office of People's Republic of China on Apr. 3, 2013 and entitled "Method, device and system for transmit power control during device-to-device communication", which is hereby incorporated by reference in its entirety.

FIELD

The present invention relates to the field of communications and particularly to a method, device and system for controlling transmit power in Device to Device (D2D) communication.

BACKGROUND

In traditional Long Term Evolution (LTE) cellular communication, voice, data and other traffic between two UEs are exchanged through evolved NodeBs (eNBs) where they reside, and a core network.

D2D, which is a direct communication technology between UEs, refers to that data are transmitted between the adjacent UEs in a short-distance range over a direct link, without being forwarded by a central node (i.e., a base station).

The LTE D2D technology refers to D2D communication controlled by an LTE network in an LTE licensed frequency band. The LTE D2D technology has been introduced to enable the LTE technology to evolve from the simple radio mobile cellular communication technology toward the universal connectivity technology.

Unlike cellular communication, a node transmitting data to a UE in D2D is another UE, as illustrated in FIG. 1. Data transmitted by a User Equipment A (UE, or referred to a terminal) in FIG. 1 is received by a UE B. In D2D communication, transmit power of the UE as the transmitting end is adjusted similarly to uplink transmit power in LTE cellular communication. The D2D link refers to a link in D2D communication, and an N2D link refers to a link between an eNB and a UE in cellular communication.

However there has been absent so far a particular solution to adjusting transmit power of a UE as the transmitting end in D2D communication, if the transmit power of the UE as the transmitting end is adjusted in the same way as uplink transmit power in LTE cellular communication, then there may be considerable interference upon other UEs in a cellular network (a UE in cellular communication over the cellular network, and a UE in D2D communication over the cellular network).

SUMMARY

An object of the invention is to provide a method, device and system for controlling transmit power in D2D communication so as to enable a solution to adjusting transmit power of a transmitting UE in D2D communication.

The object of the invention is attained in the following technical solutions:

A method for controlling transmit power in D2D communication includes:
  determining, by a network device, a maximum allowable transmit power for a first UE according to a maximum interference level tolerable for a cellular network and/or a maximum allowable interference level of the first UE to another receiving UE, wherein the first UE is a transmitting UE in D2D communication, and the other receiving UE is other than a receiving UE in D2D communication in which the first UE participates; and
  sending, by the network device, the maximum allowable transmit power for the first UE to the first UE so that the first UE determines transmit power in D2D communication according to the maximum allowable transmit power.

A method for controlling transmit power in D2D communication includes:
  receiving, by a first UE which is a transmitting UE in D2D communication, a maximum allowable transmit power for the first UE, sent by a network device, wherein the maximum allowable transmit power for the first UE is determined according to the maximum interference level tolerable for a cellular network and/or the maximum allowable interference level of the transmitting UE to another receiving UE other than a receiving UE in D2D communication in which the transmitting UE participates; and
  determining, by the first UE, transmit power in D2D communication according to the maximum allowable transmit power.

A network device includes:
  a maximum transmit power determining module configured to determine a maximum allowable transmit power for a first UE according to a maximum interference level tolerable for a cellular network and/or a maximum allowable interference level of the first UE to another receiving UE, wherein the first UE is a transmitting UE in D2D communication, and the other receiving UE is other than a receiving UE in D2D communication in which the first UE participates; and
  a transmit power sending module configured to send the maximum allowable transmit power for the first UE to the first UE so that the first UE determines transmit power in D2D communication according to the maximum allowable transmit power.

A transmitting UE in D2D communication includes:
  a maximum transmit power receiving module configured to receive the maximum allowable transmit power for the transmitting UE, sent by a network device, wherein the maximum allowable transmit power for the transmitting UE is determined according to the maximum interference level tolerable for a cellular network and/or the maximum allowable interference level of the transmitting UE to another receiving UE other than a receiving UE in D2D communication in which the transmitting UE participates; and
  a transmit power determining unit configured to determine transmit power in D2D communication according to the maximum allowable transmit power.

A communication system includes:
  a network device, and a first UE in D2D communication over a cellular network of the network device, wherein the first UE is a transmitting UE in D2D communication;
  the network device is configured to determine the maximum allowable transmit power for the first UE according to the maximum interference level tolerable for a cellular network and/or the maximum allowable interference level of the first UE to another receiving UE; and to send the maximum allowable transmit power for the first UE to the first UE, wherein the other receiving UE is other than a receiving UE in D2D communication in which the first UE participates; and the first UE is configured to receive the maximum allowable transmit power for the first UE, sent by the network device, and to determine transmit power in D2D communication according to the maximum allowable transmit power.

In the technical solutions according to the embodiments of the invention, the transmitting UE in D2D communication determines the transmit power in D2D communication taking into account the maximum interference level tolerable for the cellular network and/or the maximum allowable interference level to the other receiving UE, to thereby lower an interference upon a UE in another cellular cell accessing a cellular network resource or a UE in D2D communication.

DETAILED DESCRIPTION OF THE EMBODIMENTS

The inventors have identified during making of the invention that if transmit power of a transmitting UE in D2D communication is adjusted in the same way as uplink transmit power in LTE cellular communication, then there may be considerable interference on other UEs in a cellular network because an interference level bearable to the cellular network and/or an interference level allowable for another receiving UE (other than a receiving UE in D2D communication in which the first UE participates) is not taken into account. Embodiments of the invention provide a solution to controlling transmit power in D2D communication to thereby lower an interference of D2D communication on the other UEs in the cellular network.

In the embodiments of the invention, a transmitting UE, in D2D communication, with transmit power to be adjusted will be referred to as a first UE, and a receiving UE, which receives data transmitted by the first UE, in D2D communication will be referred to as a second UE.

Such a technical solution according to the embodiments of the invention can be described that a network device determines the maximum allowable transmit power for the first terminal according to the maximum interference level tolerable for the cellular network and/or the maximum allowable interference level of the first UE to another receiving UE; and the network device sends the maximum allowable transmit power for the first UE to the first UE; and the first UE receives the maximum allowable transmit power for the first UE, transmitted by the network device, and determines transmit power in D2D communication according to the maximum allowable transmit power, where the another receiving UE is other receiving UEs than the receiving UE in D2D communication in which the first UE participates.

The network device in the embodiments of the invention can be either an evolved NodeB (eNB) in an LTE system or a NodeB (NB) in a Universal Mobile Telecommunication System (UMTS) or another network device communicating with the UE and scheduling a resource for the UE.

In the technical solution according to the embodiments of the invention, the transmitting UE in D2D communication can determine the transmit power taking into account the maximum interference level tolerable for the cellular network and/or the maximum allowable interference level of the transmitting UE to the other receiving UE, to thereby low an interference on a UE in another cellular cell accessing a cellular network resource or a UE in D2D communication.

The technical solution according to the embodiments of the invention will be described below in details with reference to the drawings.

Figure 1:
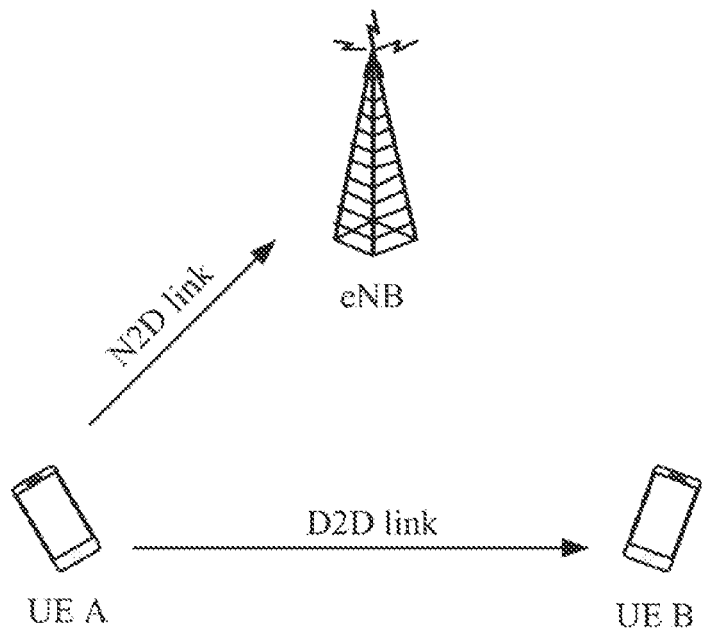
FIG. 1 illustrates a schematic diagram of a system for D2D communication over a cellular network resource.
Figure 2:
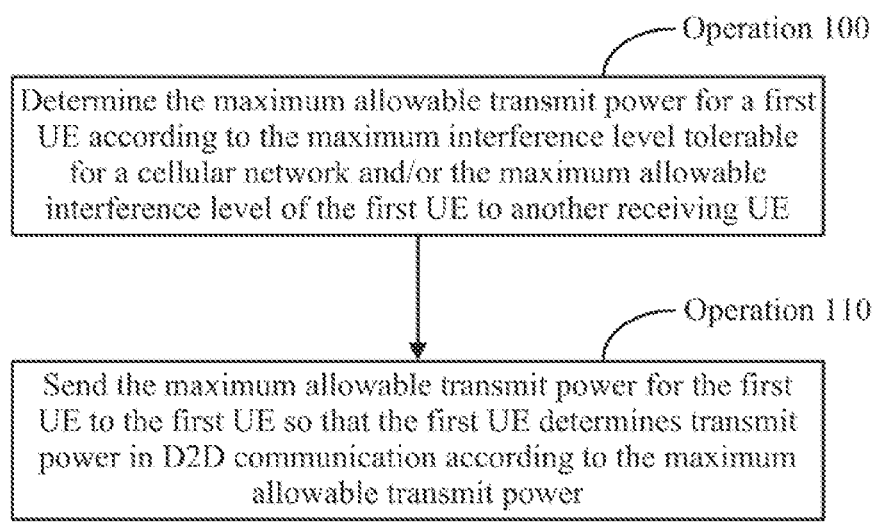
FIG. 2 illustrates a flow chart of a method at the network device side according to an embodiment of the invention.

FIG. 2 illustrates a flow chart of a method for controlling transmit power in D2D communication at the network device side according to an embodiment of the invention, where a particular implementation thereof includes the following operations:

Operation 100: determine the maximum allowable transmit power for a first UE according to the maximum interference level tolerable for a cellular network and/or the maximum allowable interference level of the first UE to another receiving UE.

Operation 110: send the maximum allowable transmit power for the first UE to the first UE so that the first UE determines transmit power in D2D communication according to the maximum allowable transmit power.

Here the transmit power determined by the first UE is transmit power in D2D communication.

Here the network device can determine the maximum allowable transmit power for the first UE in the following approaches without any limitation thereto:

In a first approach in which the maximum transmit power is determined:

The network device determines first maximum transmit power according to the maximum interference level tolerable for the cellular network, and determines the first maximum transmit power as the maximum allowable transmit power for the first UE.

In a second approach in which the maximum transmit power is determined:

The network device determines second maximum transmit power according to the maximum allowable interference level of the first UE to the other receiving UE, and determines the second maximum transmit power as the maximum allowable transmit power for the first UE.

In a third approach in which the maximum transmit power is determined:

The network device determines first maximum transmit power according to the maximum interference level tolerable for the cellular network, determines second maximum transmit power according to the maximum interference level of the first UE allowable for the other receiving UE, and selects the smaller one of the first maximum transmit power and the second maximum transmit power as the maximum allowable transmit power for the first UE.

D2D communication may be conducted over an uplink resource of the cellular network or may be conducted over a downlink resource of the cellular network.

If the first UE transmits D2D data over an uplink resource of the cellular network, then the network device can determine the first maximum transmit power according to useful signal power to be received over the uplink resource, an uplink path loss of the first UE to the network device, and the maximum interference level tolerable for the cellular network. The maximum interference level tolerable for the cellular network is the maximum interference level tolerable for the cellular network in the uplink. The useful signal power to be received by the network device over the uplink resource and the maximum interference level tolerable for the cellular network in the uplink are predetermined values.

The network device can determine the first maximum transmit power according to the maximum interference level bearable to the cellular network in the following approaches without any limitation thereto:

In a first approach in which the first maximum transmit power is determined:

The network device receives an uplink channel and/or an uplink signal, sent by the first UE over the cellular network, with transmit power to be defined by the network device, and determines the uplink path loss of the first UE to the network device according to the uplink channel and/or the uplink signal; and determines the first maximum transmit power according to the useful signal power to be received by the network device over the uplink resource, the uplink path loss of the first UE to the network device, and the maximum interference level tolerable for the cellular network.

Here the uplink channel sent by the first UE can be any uplink channel, e.g., a Physical Uplink Control Channel (PUCCH), a Physical Uplink Shared Channel (PUSCH), etc., and the uplink signal sent by the first UE is any uplink signal.

The useful signal power to be received by the network device over the uplink resource is a predetermined value.

The maximum interference level tolerable for the cellular network is the maximum interference level tolerable for the cellular network in the uplink, which is a predetermined value.

In the first approach of determining the first maximum transmit power, the network device estimates the uplink path loss of the first UE to the network device according to the uplink channel and/or the uplink signal because the network device does not know real transmit power of the first UE.

In a second approach of determining the first maximum transmit power:

The network device sends a downlink reference signal to the first UE, receives receive power of the downlink reference signal, reported by the first UE, determines a downlink path loss of the network device to the first UE according to the receive power, and determines the uplink path loss of the first UE to the network device according to the downlink path of the network device to the first UE; and determines the first maximum transmit power according to the useful signal power to be received by the network device over the uplink resource, the uplink path loss of the first UE to the network device, and the maximum interference level tolerable for the cellular network.

The useful signal power to be received by the network device over the uplink resource is a predetermined value.

The maximum interference level tolerable for the cellular network is the maximum interference level tolerable for the cellular network in the uplink, which is a predetermined value.

In a third approach of determining the first maximum transmit power:

The network device receives a downlink path loss of the network device to the first UE, reported by the first UE; determines the downlink path of the network device to the first UE as the uplink path loss of the first UE to the network device; and determines the first maximum transmit power according to the useful signal power to be received by the network device over the uplink resource, the uplink path loss of the first UE to the network device, and the maximum interference level tolerable for the cellular network.

Here the first UE determines the downlink path of the network device to the first UE according to receive power of the downlink in the cellular network. The first UE can determine the downlink path loss of the network device to the first UE according to receive power of a downlink reference signal without any limitation thereto.

The useful signal power to be received by the network device over the uplink resource is a predetermined value.

The maximum interference level tolerable for the cellular network is the maximum interference level tolerable for the cellular network in the uplink.

Since an interference level of the first UE to the uplink of the cellular network meets Equation 1 of:

$$R_{I\text{-}A\text{-}eNB} = (P_{A\text{-}D2D\text{-}1} - PL_{A\text{-}eNB})/P_{valid} \qquad \text{Equation 1}$$

Where $R_{I\text{-}A\text{-}eNB}$ represents the interference level of the first UE to the uplink of the cellular network; $P_{A\text{-}D2D\text{-}1}$ represents the transmit power of the first UE in D2D communication in dBm; $P_{valid}$ represents the useful signal power to be received by the network device over the uplink resource, which is a predetermined value in dBm; and $PL_{A\text{-}eNB}$ represents the uplink path loss of the first UE to the network device in dB.

Equation 2 in which the first maximum transmit power is determined can be derived from Equation 1 above:

$$P_{A\text{-}D2D\text{-}max1} = R_{I\text{-}A\text{-}eNB\text{-}max} * P_{valid} + P_{LA\text{-}eNB} \qquad \text{Equation 2}$$

Where $P_{A\text{-}D2D\text{-}max1}$ represents the first maximum transmit power in dBm, and $R_{I\text{-}A\text{-}eNB\text{-}max}$ represents the maximum interference level tolerable for the uplink of the cellular network, which is a predetermined value.

It shall be noted that Equation 2 merely illustrates a preferred implementation in which the first maximum transmit power is determined, but the invention can alternatively determine the first maximum transmit power otherwise according to the uplink path loss, and the maximum interference level tolerable for the uplink of the cellular network.

If the first UE transmits D2D data over a downlink resource of the cellular network, then an interference of the first UE to another UE in the cellular network will be taken into account. The network device determines the first maximum transmit power according to the maximum interference level tolerable for the cellular network as follows:

The network device determines the first maximum transmit power according to the maximum interference level tolerable for the cellular network, and a parameter fed back by a UE in a group of target UEs to reflect an interference level from the first UE, where the maximum interference level tolerable for the cellular network is the maximum interference level tolerable for the UE in the group of target UEs in the cellular network in the downlink and receive power of the UE in the group of target UEs to receive the reference signal of the first UE is above a power threshold, or the distance between the UE in the group of target UEs and the first UE is below a distance threshold.

Particularly if the first UE transmits D2D data over a downlink resource of the cellular network, then an interference of the first UE upon another UE in the cellular network will be taken into account. The network device can determine the first maximum transmit power according to the maximum interference level tolerable for the cellular network in the following approaches without any limitation thereto:

In a fourth approach of determining the first maximum transmit power:

The network device sends resource information of the reference signal configured for the first UE to the UE in the group of target UEs; obtains the parameter fed back by the UE in the group of target UEs to reflect an interference level from the first UE; and determines the first maximum transmit power according to the maximum interference level tolerable for the cellular network, and the parameter fed back by the UE in the group of target UEs to reflect an interference level from the first UE.

Here the reference signal configured for the first UE refers to a reference signal, configured for the first UE and sent by the first UE, which can be a reference signal in D2D communication or a reference signal in cellular communication. The resource information of the reference signal can include but will not be limited to a pattern, a transmit periodicity, an identifier (ID), etc., of the reference signal.

The group of target UEs includes at least one UE in cellular communication over the cellular network.

For the UE in the group of target UEs, the receive power of the reference signal of the first UE is above a power threshold. The reference signal can be any reference signal sent by the first UE, and the other UE knows in advance the resource information of the reference signal.

Or the distance between the UE in the group of target UEs and the first UE is below a distance threshold.

The parameter to reflect an interference level from the first UE can include but will not be limited to receive power (RSRP$_{A-C}$) for receiving the reference signal sent by the first UE (RSRP$_{A-C}$). The UE in the group of target UEs determines the parameter to reflect an interference level from the first UE, by receiving the reference signal sent by the first UE, and sends to the network device the parameter to reflect an interference level from the first UE. Particularly the UE in the group of target UEs receives the reference signal sent by the first UE, according to the resource information of the reference signal, sent by the network device.

If the first UE transmits D2D data over a downlink resource of the cellular network, then the maximum interference level bearable to the cellular network is the maximum interference level tolerable for the UE in the group of target UEs over the cellular network in the downlink, which is a predetermined value.

If there are X UEs in the group of target UEs, based on the fourth approach of determining the first maximum transmit power, the first maximum transmit power can be determined in Equation 3 without any limitation thereto:

$$P_{A-D2D-Max1} = \min_{x \in X}(P_{eNB-x}/R_{max} + PL_{A-x}) \qquad \text{Equation 3}$$

Where P$_{eNB-x}$ represents receive power of a UE x in the group of target UEs over the cellular network in the downlink, R$_{max}$ represents the maximum receive power supported by the UE x in the group of target UEs, which can be determined according to the maximum interference level tolerable for the UE x over the cellular network in the downlink, and PL$_{A-x}$ represents a path loss of the first UE to the UE x in the group of target UEs, which is determined by the network device according to RSRP$_{A-C}$ reported by the UE x in the group of target UEs.

In a fifth approach of determining the first maximum transmit power:

The network device configures the group of target UEs with a zero-power reference signal, and sends resource information of the zero-power reference signal to the UE in the group of target UEs; obtains the parameter fed back by the UE in the group of target UEs for reflecting an interference level from the first UE; and determines the first maximum transmit power according to the maximum interference level tolerable for the cellular network, and the parameter fed back by the UE in the group of target UEs for reflecting an interference level from the first UE.

Here the group of target UEs, and the maximum interference level tolerable for the cellular network can be defined as described for the fourth approach in which the first maximum transmit power is determined, so a repeated description thereof will be omitted here.

The parameter for reflecting an interference level from the first UE can include but will not be limited to receive power over a resource of the zero-power reference signal, or channel quality information derived from the receive power over the resource of the zero-power reference signal. The UE in the group of target UEs determines the parameter for reflecting an interference level from the first UE, by receiving the receive power over the resource of the zero-power reference signal, and sends to the network device the parameter for reflecting an interference level from the first UE. Particularly the UE in the group of target UEs receives the reference signal sent by the first UE, according to the resource information of the reference signal, sent by the network device.

If there are X UEs in the group of target UEs, based on the fifth approach of determining the first maximum transmit power, the first maximum transmit power can be determined in Equation 4 without any limitation thereto:

$$P_{A-D2D-Max1} = \min_{x \in X}(P_{eNB-x}/R_{max} + PL_{A-x}) \qquad \text{Equation 4}$$

Where P$_{eNB-x}$/R$_{max}$ is determined by the network device according to the receive power over the resource of the zero-power reference signal, reported by the UE x in the group of target UEs, or the channel quality information derived from the receive power over the resource of the zero-power reference signal; and PL$_{A-x}$ represents a path loss of the first UE to the UE x in the group of target UEs, reported by the UE x in the group of target UEs.

In a sixth approach of determining the first maximum transmit power:

The network device sends resource information and predetermined transmit power of the reference signal, which are configured for the first UE, to the UE in the group of target UEs; the network device obtains a path loss of the first UE to the UE in the group of target UEs, fed back by the UE in the group of target UEs; and determines the first maximum transmit power according to the maximum interference level tolerable for the cellular network, and the path loss fed back by the UE in the group of target UEs.

Here the group of target UEs and the maximum interference level tolerable for the cellular network can be defined as described for the fourth approach in which the first maximum transmit power is determined, so a repeated description thereof will be omitted here.

The UE in the group of target UEs determines the path loss of the first UE to the UE in the group of target UEs by receiving the reference signal sent by the first UE, and sends the path loss to the network device.

Particularly the UE in the group of target UEs receives the reference signal sent by the first UE, according to the resource information of the reference signal, sent by the network device, and determines the path loss of the first UE to the group of target UEs according to the receive power for receiving the reference signal, and the predetermined transmit power of the reference signal.

If there are X UEs in the group of target UEs, based on the fifth approach of determining the first maximum transmit power, the first maximum transmit power can be determined in Equation 4 without any limitation thereto:

$$P_{A-D2D-max1} = \min_{x \in X}(R_{I-A-x-max} * RSRP_{eNB-x}) \quad \text{Equation 5}$$

Where $R_{I-A-x-max}$ represents the maximum interference level tolerable for a UE x in the group of target UEs over the cellular network in the downlink, and $RSRP_{eNB-x}$ represents receive power of the reference signal, received by the UE x, sent by the first UE, which can be determined by the network device according to a received path loss of the first UE to the UE x, and the predetermined transmit power of the reference signal.

In the embodiment of the invention, the network device determines the second maximum transmit power according to the maximum allowable interference level of the first UE to the other receiving UE as follows:

The network device determines the second maximum transmit power according to the maximum allowable interference level of the first UE to a receiving UE in a pair of target D2D communication UEs, and a parameter fed back by the receiving UE in the pair of target D2D communication UEs for reflecting an interference level from the first UE, where the maximum allowable interference level of the first UE to the other receiving UE is the maximum allowable interference level of the first UE to the receiving UE in the pair of target D2D communication UEs; and the pair of target D2D communication UEs conducts D2D communication over the same cellular network resource as the first UE, and the receive power for receiving the reference signal thereof of the first UE is above a power threshold, or the pair of target D2D communication UEs conducts D2D communication over the same cellular network resource as the first UE, and the distance thereof of from the first UE is below a distance threshold.

Particularly the second maximum transmit power can be determined according to the maximum allowable interference level of the first UE to the other receiving UE by a number of approaches, several of which will be exemplified below:

In a first approach of determining the second maximum transmit power:

The network devices sends resource information of the reference signal configured for the first UE to the receiving UE in the pair of target D2D communication UEs; obtains the parameter fed back by the receiving UE in the pair of target D2D communication UEs for reflecting an interference level from the first UE; and determines the second maximum transmit power according to the maximum allowable interference level of the first UE to the receiving UE in the pair of target D2D communication UEs, and the parameter fed back by the receiving UE in the pair of target D2D communication UEs for reflecting an interference level from the first UE.

Here the maximum allowable interference level of the first UE to the receiving UE in the pair of target D2D communication UEs is a predetermined value.

The pair of target D2D communication UEs conducts D2D communication over the same cellular network resource as the first UE (that is, both the pair of target D2D communication UEs and the first UE access an uplink resource of the cellular network or a downlink resource of the cellular network), and receive power for receiving the reference signal of the first UE is above the power threshold. The reference signal can be any reference signal sent by the first UE, and another pair of D2D communication UEs knows in advance the resource information of the reference signal. Either the receive power of the reference signal of the first UE received by both the receiving UE and the transmitting UE in the pair of D2D communication UEs can be above the power threshold, or the receive power of the reference signal of the first UE received by either of the UEs in the pair of D2D communication UEs can be above the power threshold. Since the first UE transmits D2D data over an uplink resource of the cellular network taking into account primarily an interference upon the receiving UE in the other pair of D2D communication UEs, preferably a pair of D2D communication UEs including a receiving UE, with a receive power for receiving the reference signal of the first UE above the power threshold, is determined as the pair of target D2D communication UEs.

Alternatively the pair of target D2D communication UEs conducts D2D communication over the same cellular network resource as the first UE, and the distance thereof from the first UE is below the distance threshold. Either the distances from both the receiving UE and the transmitting UE in the pair of D2D communication UEs, to the first UE can be below the distance threshold, or the distance between the receiving UE or the transmitting UE in the pair of D2D communication UEs, and the first UE can be below the distance threshold. Since the first UE transmits D2D data over a downlink resource of the cellular network taking into account primarily an interference thereof to other receiving UEs, preferably a pair of D2D communication UEs including a receiving UE, with a distance from the first UE being below the distance threshold, is determined as the pair of target D2D communication UEs.

The parameter for reflecting an interference level from the first UE can include but will not be limited to: receive power for receiving the reference signal sent by the first UE. The receiving UE in the pair of target D2D communication UEs determines the parameter for reflecting an interference level from the first UE, by receiving the reference signal sent by the first UE, and sends to the network device the parameter for reflecting an interference level from the first UE. Particularly the receiving UE in the pair of target D2D communication UEs receives the reference signal sent by the first UE, according to the resource information of the reference signal, sent by the network device.

In a second approach of determining the second maximum transmit power:

The network device configures the receiving UE in the pair of target D2D communication UEs with a zero-power reference signal, and sends resource information of the zero-power reference signal to the receiving UE; obtains the parameter fed back by the receiving UE for reflecting an interference level from the first UE; and determines the second maximum transmit power according to the maximum allowable interference level of the first UE to the receiving UE in the pair of target D2D communication UEs, and the parameter fed back by the receiving UE in the pair of target D2D communication UEs for reflecting an interference level from the first UE.

Here the pair of target D2D communication UEs can be defined as described for the first approach in which the second maximum transmit power is determined, so a repeated description thereof will be omitted here.

The maximum allowable interference level the first UE to the receiving UE in the pair of target D2D communication UEs is a predetermined value.

The parameter for reflecting an interference level from the first UE can include but will not be limited to: receive power for receiving the zero-power reference signal, or channel quality information derived from the receive power for receiving the zero-power reference signal. The receiving UE determines the parameter for reflecting an interference level from the first UE, by receiving the receive power over a resource of the zero-power reference signal, and sends to the network device the parameter for reflecting an interference level from the first UE.

In a third approach of determining the second maximum transmit power:

The network device sends resource information and predetermined transmit power of the reference signal configured for the first UE to the receiving UE in the pair of target D2D communication UEs; obtains the parameter fed back by the receiving UE for reflecting a path loss of the first UE to the receiving UE; and determines the second maximum transmit power according to the maximum allowable interference level of the first UE to the receiving UE in the pair of target D2D communication UEs, and the path loss fed back by the receiving UE in the pair of target D2D communication UEs.

Here the pair of target D2D communication UEs can be defined as described for the first approach of determining the second maximum transmit power, so a repeated description thereof will be omitted here.

The maximum allowable interference level of the first UE to the receiving UE in the pair of target D2D communication UEs is a predetermined value.

The receiving UE in the pair of target D2D communication UEs determines the path loss of the first UE to the receiving UE by receiving the reference signal sent by the first UE, and sends the path loss to the network device.

Particularly the receiving UE receives the reference signal sent by the first UE according to the resource information of the reference signal sent by the network device, and determines the path loss of the first UE to the receiving UE according to the receive power for receiving the reference signal, and the predetermined transmit power of the reference signal.

Further to any one of the embodiments above of the method at the network device side, the network device can further determine target transmit power of the first UE in D2D communication. Correspondingly the network device obtains a path loss of the first UE to a second UE, and a parameter for reflecting an interference level and a noise level of the second UE, and determines the target transmit power of the first UE according to the path loss of the first UE to the second UE, and the parameter for reflecting an interference level and a noise level of the second UE, and sends the target transmit power to the first UE. Particularly the network device obtains long-term information, reported by the second UE, which carries the path loss of the first UE to the second UE and the parameter for reflecting an interference level and a noise level of the second UE, the network device determines the target transmit power of the first UE in D2D communication according to the path loss of the first UE to the second UE and the parameter for reflecting an interference level and a noise level of the second UE, and sends the target transmit power to the first UE.

If the network device determines the target transmit power of the first UE in D2D communication, then the network device can send operating point information of transmit power in D2D communication, which includes but will not be limited to: the maximum allowable transmit power for the first UE, and the target transmit power of the first UE in D2D communication.

Further to any one of the embodiments above of the method, the network device can further determine a step length by close-loop adjustment for the first UE. Particularly the network device obtains D2D communication quality information between the first UE and a second UE, determines the step length by close-loop adjustment for transmit power of the first UE in D2D communication according to the D2D communication quality information, and sends the step length by the close-loop adjustment to the first UE. In the embodiment of the invention, the step length by the close-loop adjustment can be carried in downlink control signaling, and the closed-loop adjustment step can be configured as a cumulative value or an absolute value.

Figure 3:
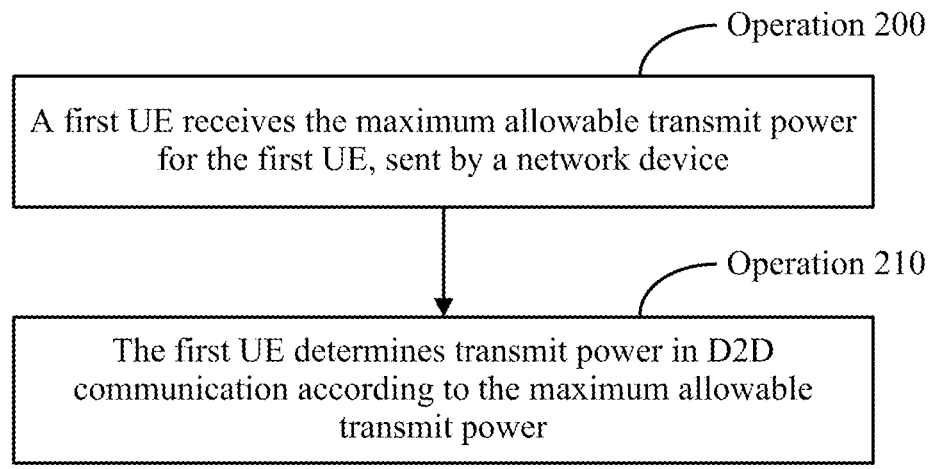
FIG. 3 illustrates a flow chart of a first method at the UE side according to an embodiment of the invention.

FIG. 3 illustrates a flow chart of a method for controlling transmit power in D2D communication according to an embodiment of the invention at the first UE side, where a particular implementation thereof includes the following operations:

Operation 200, a first UE receives the maximum allowable transmit power for the first UE, sent by a network device.

Here the maximum allowable transmit power for the first UE is determined in the embodiments above of the method at the network device side, so a repeated description thereof will be omitted here.

Operation 210, the first UE determines transmit power in D2D communication according to the maximum allowable transmit power.

If there is the same or similar implementation at the first UE side as or to the network device side, then reference can be made to the description of the embodiments above of the method at the network device side, so a repeated description thereof will be omitted here.

The first UE can further determine the transmit power according to the maximum transmit power, and target transmit power in D2D communication. The target transmit power in D2D communication can be sent by the network device side or can be sent by a second UE or can be determined by the first UE.

If the target transmit power in D2D communication is determined by the first UE, then the first UE obtains a parameter for reflecting an interference level and a noise level of the second UE; and determines the target transmit power of the first UE in D2D communication according to a determined path loss of the first UE to the second UE, and the parameter for reflecting an interference level and a noise level of the second UE.

Here the first UE can receive a reference signal sent by the second UE at predetermined transmit power, determine a path loss of the second UE to the first UE according to receive power for receiving the reference signal, and the predetermined transmit power, and determine the path loss as the path loss of the first UE to the second UE. The first UE can alternatively sent the reference signal to the second UE, and the second UE can determine and feed the path loss, of the first UE to the second UE, back to the first UE.

If the target transmit power of the first UE is determined by the second UE, then the first UE sends a reference signal and transmit power of the reference signal to the second UE. The second UE determines a path loss, of the first UE to the second UE, according to receive power for receiving the reference signal, and the received transmit power of the signal, determines the target transmit power of the first UE according to the path loss, and sends the target transmit power to the first UE. The first UE receives the target transmit power of the first UE in D2D communication, fed back by the second UE.

Further to any one of the embodiments of the method at the first UE side, preferably the first UE can adjust the transmit power in D2D communication according to a step length by close-loop adjustment sent by the network device. Particularly the first UE receives the step length by close-loop adjustment sent by the network device; and adjusts the determined transmit power in D2D communication according to the step length by close-loop adjustment.

It shall be noted that those skilled in the art can appreciate that the transmit power of the first UE in D2D communication may be determined according to the maximum allowable transmit power, the target transmit power, and the step length by close-loop adjustment. Only a preferred implementation in which the transmit power in D2D communication is determined will be described in the embodiment of the invention: after the first UE receives the step length by the close-loop adjustment, the first UE determines the transmit power according to the maximum allowable transmit power, the target transmit power, the step length δ by the close-loop adjustment, the path loss of the first UE to the second UE, a Modulation and Coding Scheme (MCS) level parameter $D_{MCS}$, a bandwidth M, and the maximum transmit power $P_{Tmax}$ (in dBm) supported by the first UE in Equation 6 of:

$$P_{A\text{-}D2D} = \min((P_{Tmax} - P_A), P_{A\text{-}D2D\text{-}max}, (P_{o\text{-}A\text{-}B} + PL_{A\text{-}B} + D_{MCS} + 10\lg M + \delta)) \quad \text{Equation 6}$$

Where $P_{A\text{-}D2D}$ represents the transmit power of the first UE in D2D communication (in dBm); and if the first UE further conducts cellular communication over a different resource, then $P_A = P_{A\text{-}eNB}$, that is, $P_A$ represents uplink transmit power of the first UE in cellular communication (in dBm); otherwise, $P_A = 0$; $P_{o\text{-}A\text{-}B}$ represents the target transmit power of the first UE in D2D communication (in dBm); and $PL_{A\text{-}B}$ represents the path loss of the first UE to the second UE (in dB).

The transmit power in D2D communication can be determined in Equation 6 above further taking into account the path loss of the first UE to the second UE, to thereby guarantee a received quality of the second UE. The smallest one of $(P_{Tmax} - P_A)$, $P_{A\text{-}D2D\text{-}max}$, $(P_{o\text{-}A\text{-}B} + PL_{A\text{-}B} + D_{MCS} + 10\lg M + \delta)$ is selected as the transmit power in D2D communication to thereby lower the transmit power as much as possible while satisfying a communication demand for the purpose of saving energy.

Figure 4:
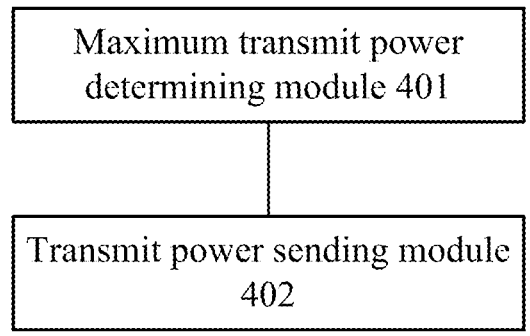
FIG. 4 illustrates a schematic structural diagram of a network device according to an embodiment of the invention.

Based upon the same inventive idea as the method, an embodiment of the invention further provides a network device structured as illustrated in FIG. 4, where a particular structure thereof is as follows:

A maximum transmit power determining module 401 is configured to determine the maximum allowable transmit power for a first UE according to the maximum interference level tolerable for a cellular network and/or the maximum allowable interference level of the first UE to another receiving UE, where the first UE is a transmitting UE in D2D communication, and the other receiving UE is other than a receiving UE in D2D communication in which the first UE participates; and A transmit power sending module 402 is configured to send the maximum allowable transmit power for the first UE to the first UE so that the first UE determines transmit power in D2D communication according to the maximum allowable transmit power.

Reference can be made to the implementation of the method above at the network device side for the same or similar technical features of the embodiment of the network device according to the invention as or to those of the method at the network device side, so a repeated description thereof will be omitted here.

Preferably the maximum transmit power determining module 401 is configured:

To determine first maximum transmit power according to the maximum interference level tolerable for the cellular network, and to determine the first maximum transmit power as the maximum allowable transmit power for the first UE; or To determine second maximum transmit power according to the maximum allowable interference level of the first UE to the other receiving UE, and to determine the second maximum transmit power as the maximum allowable transmit power for the first UE; or To determine first maximum transmit power according to the maximum interference level tolerable for the cellular network, to determine second maximum transmit power according to the maximum allowable interference level of the first UE to the other receiving UE, and to select the smaller one of the first maximum transmit power and the second maximum transmit power as the maximum allowable transmit power for the first UE.

Preferably if the first UE transmits D2D data over an uplink resource of the cellular network, then the maximum transmit power determining module 401 configured to determine the first maximum transmit power according to the maximum interference level tolerable the cellular network is configured:

To determine the first maximum transmit power according to useful signal power to be received over the uplink resource, an uplink path loss of the first UE to the network device, and the maximum interference level tolerable for the cellular network, where the maximum interference level tolerable for the cellular network is the maximum interference level tolerable for the uplink of the cellular network.

Preferably if the first UE transmits D2D data over an uplink resource of the cellular network, then before the first maximum transmit power is determined according to the maximum interference level tolerable for the cellular network, the maximum transmit power determining module 401 is further configured:

To receive an uplink channel and/or an uplink signal, sent by the first UE over the cellular network, with transmit power to be defined by the network device, and to determine the uplink path loss of the first UE to the network device according to the uplink channel and/or the uplink signal.

Preferably if the first UE transmits D2D data over an uplink resource of the cellular network, then before the first maximum transmit power is determined according to the maximum interference level tolerable for the cellular network, the maximum transmit power determining module 401 is further configured:

To send a downlink reference signal to the first UE, to receive the receive power of the downlink reference signal, reported by the first UE, to determine a downlink path loss of the network device to the first UE according to the receive power, and to determine the downlink path of the network device to the first UE as the uplink path loss of the first UE to the network device.

Preferably if the first UE transmits D2D data over an uplink resource of the cellular network, then before the first maximum transmit power is determined according to the maximum interference level tolerable for the cellular network, the maximum transmit power determining module 401 is further configured:

To receive a downlink path loss of the network device to the first UE, reported by the first UE; and To determine the downlink path of the network device to the first UE as the uplink path loss of the first UE to the network device.

Preferably if the first UE transmits D2D data over a downlink resource of the cellular network, then the maximum transmit power determining module 401 configured to determine the first maximum transmit power according to the maximum interference level tolerable for the cellular network is configured:

To determine the first maximum transmit power according to the maximum interference level tolerable for the cellular network, and a parameter fed back by a UE in a group of target UEs for reflecting an interference level from the first UE. The maximum interference level tolerable for the cellular network is the maximum interference level tolerable for the UE in the group of target UEs over the downlink of the cellular network, and receive power of the UE in the group of target UEs for receiving a reference signal of the first UE is above a power threshold, or the distance between the UE in the group of target UEs and the first UE is below a distance threshold.

Preferably if the first UE transmits D2D data over a downlink resource of the cellular network, then before the first maximum transmit power is determined according to the maximum interference level tolerable for the cellular network, the maximum transmit power determining module 401 is further configured:

To send resource information of a reference signal configured for the first UE to the UE in the group of target UEs, so that the UE in the group of target UEs determines the parameter for reflecting an interference level from the first UE, by receiving the reference signal sent by the first UE. The receive power of the UE in the group of target UEs for receiving the reference signal of the first UE is above a power threshold, or the distance between the UE in the group of target UEs and the first UE is below a distance threshold; and To obtain the parameter fed back by the UE in the group of target UEs for reflecting an interference level from the first UE. The parameter for reflecting an interference level from the first UE includes the receive power for receiving the reference signal sent by the first UE.

Preferably if the first UE transmits D2D data over a downlink resource of the cellular network, then before the first maximum transmit power is determined according to the maximum interference level tolerable for the cellular network, the maximum transmit power determining module 401 is further configured:

To configure the group of target UEs with a zero-power reference signal, and to send resource information of the zero-power reference signal to the UE in the group of target UEs, so that the UE in the group of target UEs determines the parameter for reflecting an interference level from the first UE according to the receive power over a resource of the zero-power reference signal. The receive power of the UE in the group of target UEs for receiving the reference signal of the first UE is above a power threshold, or the distance between the UE in the group of target UEs and the first UE is below a distance threshold; and To obtain the parameter fed back by the UE in the group of target UEs for reflecting an interference level from the first UE. The parameter for reflecting an interference level from the first UE includes the receive power over the resource of the zero-power reference signal, or channel quality information derived from the receive power over the resource of the zero-power reference signal.

Preferably if the first UE transmits D2D data over a downlink resource of the cellular network, then the maximum transmit power determining module 401 configured to determine the first maximum transmit power according to the maximum interference level tolerable for the cellular network is configured:

To send resource information and predetermined transmit power of a reference signal configured for the first UE to a UE in a group of target UEs, so that the UE in the group of target UEs determines a path loss of the first UE to the UE in the group of target UEs by receiving the reference signal sent by the first UE, where receive power of the UE in the group of target UEs for receiving the reference signal of the first UE is above a power threshold, or the distance between the UE in the group of target UEs and the first UE is below a distance threshold;

To obtain the path loss fed back by the UE in the group of target UEs; and

To determine the first maximum transmit power according to the maximum interference level tolerable for the cellular network, and the path loss fed back by the UE in the group of target UEs, where the maximum interference level tolerable for the cellular network is maximum interference level tolerable for the UE in the group of target UEs over the downlink of the cellular network.

Preferably the maximum transmit power determining module 401 configured to determine the second maximum transmit power according to the maximum allowable interference level of the first UE to the other receiving UE is configured:

To determine the second maximum transmit power according to the maximum allowable interference level of the first UE to a receiving UE in a pair of target D2D communication UEs, and a parameter fed back by the receiving UE in the pair of target D2D communication UEs for reflecting an interference level from the first UE, where the maximum allowable interference level of the first UE to the other receiving UE is the maximum allowable interference level of the first UE to the receiving UE in the pair of target D2D communication UEs; and the pair of target D2D communication UEs conducts D2D communication over the same cellular network resource as the first UE, and receive power thereof for receiving the reference signal of the first UE is above a power threshold, or the pair of target D2D communication UEs conducts D2D communication over the same cellular network resource as the first UE, and the distance thereof from the first UE is below a distance threshold.

Preferably the maximum transmit power determining module 401 configured to determine the second maximum transmit power according to the maximum allowable interference level of the first UE to the other receiving UE is configured:

To send resource information of a reference signal configured for the first UE to the receiving UE in the pair of target D2D communication UEs, so that the receiving UE in the pair of target D2D communication UEs determines the parameter for reflecting an interference level from the first UE, by receiving the reference signal sent by the first UE; and To obtain the parameter fed back by the receiving UE in the pair of target D2D communication UEs for reflecting an interference level from the first UE, where the parameter for reflecting an interference level from the first UE includes the receive power for receiving the reference signal sent by the first UE.

Preferably the maximum transmit power determining module 401 configured to determine the second maximum transmit power according to the maximum allowable interference level of the first UE to the other receiving UE is configured:

To configure the receiving UE in the pair of target D2D communication UEs with a zero-power reference signal, and to send resource information of the zero-power reference signal to the receiving UE so that the receiving UE in the pair of target D2D communication UEs determines the parameter for reflecting an interference level from the first UE, according to receive power over a resource of the zero-power reference signal; and To obtain the parameter fed back by the receiving UE for reflecting an interference level from the first UE, where the parameter for reflecting an interference level from the first UE includes the receive power over the resource of the zero-power reference signal, or channel quality information derived from the receive power over the resource of the zero-power reference signal.

Preferably the maximum transmit power determining module 401 configured to determine the second maximum transmit power according to the maximum allowable interference level of the first UE to the other receiving UE is configured:

To send resource information and predetermined transmit power of a reference signal configured for the first UE to a receiving UE in a pair of target D2D communication UEs, so that the receiving UE determines a path loss of the first UE to the receiving UE by receiving the reference signal sent by the first UE, where the pair of target D2D communication UEs conducts D2D communication over the same cellular network resource as the first UE, and receive power thereof for receiving the reference signal of the first UE is above a power threshold, or the pair of target D2D communication UEs conducts D2D communication over the same cellular network resource as the first UE, and the distance thereof from the first UE is below a distance threshold;

To obtain the path loss fed back by the receiving UE; and

To determine the second maximum transmit power according to the maximum allowable interference level of the first UE to the receiving UE in the pair of target D2D communication UEs, and the path loss fed back by the receiving UE in the pair of target D2D communication UEs.

Preferably the network device according to the embodiment of the invention further includes a target transmit power determining module configured:

To obtain a path loss of the first UE to a second UE, and a parameter for reflecting an interference level and a noise level of the second UE, where the second UE is the receiving UE which receives data of the first UE in D2D communication; and To determine a target transmit power of the first UE according to the path loss of the first UE to the second UE, and the parameter for reflecting the interference level and the noise level of the second UE;

The transmit power sending unit 402 is further configured to send the target transmit power to the first UE.

Preferably the maximum allowable transmit power for the first UE, and the target transmit power of the first UE in D2D communication are included in operating point information for transmit power in D2D communication, sent by the network node to the first UE.

Further to any one of the embodiments above of the network device, preferably the network device further includes a closed-loop adjustment controlling module configured:

To obtain D2D communication quality information between the first UE and a second UE, the second UE is the receiving UE which receives data of the first UE in D2D communication; and To determine a step length by the close-loop adjustment for transmit power of the first UE in D2D communication according to the D2D communication quality information, and to send the step length by the close-loop adjustment to the first UE.

Figure 5:
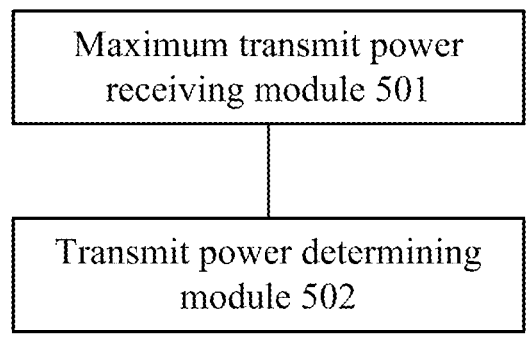
FIG. 5 illustrates a schematic structural diagram of a first UE according to an embodiment of the invention.

Based upon the same inventive idea as the method, an embodiment of the invention further provides a transmitting UE in D2D communication (i.e., a first UE) structured as illustrated in FIG. 5, where a particular structure thereof is embodied as follows:

A maximum transmit power receiving module 501 is configured to receive the maximum allowable transmit power for the first UE, sent by a network device, where the maximum allowable transmit power for the first UE is determined according to the maximum interference level tolerable for a cellular network and/or the maximum allowable interference level of the transmitting UE to another receiving UE, the another UE is other than a receiving UE in D2D communication in which the transmitting UE participates; and A transmit power determining unit 502 is configured to determine transmit power in D2D communication according to the maximum allowable transmit power.

Reference can be made to the implementation of the method above at the network device side for the same or similar technical features of the embodiment of the first UE according to the invention as or to those of the method at the network device side and the method at the first UE side, so a repeated description thereof will be omitted here.

Preferably the transmitting UE further includes a target transmit power determining module configured:

To obtain a parameter sent by the receiving UE participating in D2D communication with the transmitting UE for reflecting an interference level and a noise level of the receiving UE; and To determine target transmit power in D2D communication according to a determined path loss of the transmitting UE to the receiving UE, and the parameter for reflecting the interference level and the noise level of the receiving UE.

The transmit power determining unit 502 is configured:

To determine the transmit power in D2D communication according to the maximum allowable transmit power and the target transmit power.

Preferably the transmitting UE further includes a path loss determining module configured:

To receive a reference signal sent by the receiving UE at predetermined transmit power, to determine a path loss of the receiving UE to the transmitting UE according to receive power for receiving the reference signal and the predetermined transmit power, and to determine the path loss as the path loss of the transmitting UE to the receiving UE.

Preferably the transmitting UE further includes a target transmit power obtaining module configured:

To send a reference signal and transmit power of the reference signal to the receiving UE participating in D2D communication with the transmitting UE, so that the receiving UE determines target transmit power of the transmitting UE in D2D communication according to receive power and the transmit power of the reference signal; and To receive the target transmit power of the transmitting UE in D2D communication, fed back by the receiving UE; and The transmit power determining module 502 is configured:

To determine the transmit power in D2D communication according to the maximum allowable transmit power and the target transmit power.

Further to any one of the embodiments above of the first UE in D2D communication, preferably the transmitting UE further includes a closed-loop adjusting module configured:

To receive a step length by close-loop adjustment sent by the network device; and To adjust the determined transmit power in D2D communication according to the step length by the close-loop adjustment.

Preferably the transmit power determining module 502 is configured:

To determine the transmit power in the equation of:

$$P_{A\text{-}D2D}=\min((P_{Tmax}-P_A),P_{A\text{-}D2D\text{-}max},(P_{o\text{-}A\text{-}B}+PL_{A\text{-}B}+D_{MCS}+10\lg M+\delta))$$

Where $P_{A\text{-}D2D}$ represents the transmit power of the first UE in D2D communication; $P_{Tmax}$ represents the maximum transmit power supported by the transmitting UE; and if the transmitting UE further conducts cellular communication over a different resource, then $P_A$ represents uplink transmit power of the transmitting UE in cellular communication; otherwise, $P_A=0$; $P_{o\text{-}A\text{-}B}$ represents the target transmit power of the transmitting UE in D2D communication; $P_{A\text{-}D2D\text{-}max}$ represents the maximum allowable transmit power for the transmitting UE; $PL_{A\text{-}B}$ represents the path loss of the transmitting UE to the receiving UE; $D_{MCS}$ represents a Modulation and Coding Scheme (MCS) level parameter; M represents a bandwidth; and δ represents the step length by close-loop adjustment.

Figure 6:
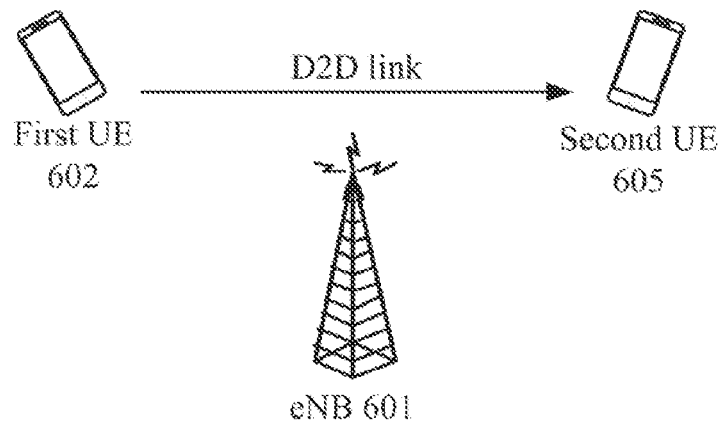
FIG. 6 illustrates a schematic structural diagram of a first system according to an embodiment of the invention.

Further to the same inventive idea as the method, an embodiment of the invention further provides a communication system structured as illustrated in FIG. 6, where a particular structure thereof is embodied as follows:

A network device 601, and a first UE 602 in D2D communication over a cellular network of the network device 601, where the first UE 602 is a transmitting UE in D2D communication.

The network device 601 is configured to determine the maximum allowable transmit power for the first UE 602 according to the maximum interference level tolerable for a cellular network and/or the maximum allowable interference level of the first UE 602 to another receiving UE; and to send the maximum allowable transmit power for the first UE 602 to the first UE 602; and The first UE 602 is configured to receive the maximum allowable transmit power for the first UE, sent by the network device 601, and to determine transmit power in D2D communication according to the maximum allowable transmit power.

Reference can be made to the implementation of the method above at the network device side for the same or similar technical features of the embodiment of the system according to the invention as or to those of the method at the network device side and the method at the first UE side, so a repeated description thereof will be omitted here.

Preferably the network device 601 configured to determine the maximum allowable transmit power for the first UE 602 is configured:

To determine first maximum transmit power according to the maximum interference level tolerable for the cellular network, and to determine the first maximum transmit power as the maximum allowable transmit power for the first UE 602; or To determine second maximum transmit power according to the maximum allowable interference level of the first UE 602 to the other receiving UE, and to determine the second maximum transmit power as the maximum allowable transmit power for the first UE 602; or To determine first maximum transmit power according to the maximum interference level tolerable for the cellular network, to determine second maximum transmit power according to the maximum allowable interference level of the first UE 602 to the other receiving UE, and to select the smaller one of the first maximum transmit power and the second maximum transmit power as the maximum allowable transmit power for the first UE 602.

D2D communication may be conducted over an uplink resource of the cellular network or a downlink resource of the cellular network.

If the first UE transmits D2D data over an uplink resource of the cellular network, then the network device can determine the first maximum transmit power according to the maximum interference level tolerable for the cellular network in the approaches described in the embodiment above of the method at the network device side without any limitation thereto.

If the first UE transmits D2D data over a downlink resource of the cellular network, then an interference of the first UE upon another UE in the cellular network will be taken into account. The network device configured to determine the first maximum transmit power according to the maximum interference level tolerable for the cellular network is configured:

To determine the first maximum transmit power according to the maximum interference level tolerable for the cellular network, and a parameter fed back by a UE in a group of target UEs for reflecting the interference level from the first UE, where the maximum interference level tolerable for the cellular network is the maximum interference level tolerable for the UE in the group of target UEs over the downlink of the cellular network, and receive power of the UE in the group of target UEs for receiving a reference signal of the first UE is above a power threshold, or the distance between the UE in the group of target UEs and the first UE is below a distance threshold.

Figure 7:
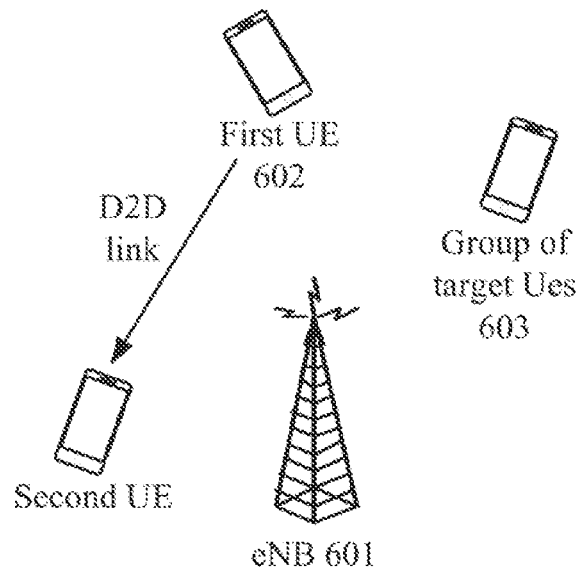
FIG. 7 illustrates a schematic structural diagram of a second system according to an embodiment of the invention.

Then preferably as illustrated in FIG. 7, the system further includes a group of target UEs in the cellular network.

In the third approach above in which the first maximum transmit power is determined, the network device 601 configured to determine the first maximum transmit power according to the maximum interference level tolerable for the cellular network is configured:

To send resource information of a reference signal configured for the first UE 602 to a UE in the group of target UEs 603; to obtain a parameter fed back by the UE in the group of target UEs 603 for reflecting an interference level from the first UE 602, where the parameter for reflecting an interference level from the first UE 602 includes the receive power for receiving the reference signal sent by the first UE 602; and to determine the first maximum transmit power according to the maximum interference level tolerable for the cellular network, and the parameter fed back by the UE in the group of target UEs 603 for reflecting an interference level from the first UE 602, where the maximum interference level tolerable for the cellular network is maximum interference level tolerable for the UE in the group of target UEs 603 over the downlink of the cellular network; and The UE in the group of target UEs 603 is configured to determine the parameter for reflecting the interference level from the first UE 602, by receiving the reference signal sent by the first UE 602, and to feed the parameter for reflecting the interference level from the first UE 602 back to the network device 601. The receive power of the UE in the group of target UEs 603 for receiving the reference signal of the first UE 602 is above a power threshold, or the distance between the UE in the group of target UEs 603 and the first UE 602 is below a distance threshold.

In the fifth approach in which the first maximum transmit power is determined, the network device 601 configured to determine the first maximum transmit power according to the maximum interference level tolerable for the cellular network is configured:

To configure the group of target UEs 603 with a zero-power reference signal, to send resource information of the zero-power reference signal to the UE in the group of target UEs 603; to obtain a parameter fed back by the UE in the group of target UEs 603 for reflecting the interference level from the first UE 602, where the parameter for reflecting the interference level from the first UE 602 includes receive power over a resource of the zero-power reference signal, or channel quality information derived from the power over the resource of the zero-power reference signal; and to determine the first maximum transmit power according to the maximum interference level tolerable for the cellular network, and the parameter fed back by the UE in the group of target UEs 603 for reflecting an interference level from the first UE 602, where the maximum interference level tolerable for the cellular network is the maximum interference level tolerable for the UE in the group of target UEs 603 over the downlink of the cellular network; and The UE in the group of target UEs 603 is configured to determine the parameter for reflecting the interference level from the first UE 602, according to the power over the resource of the zero-power reference signal, and to feed the parameter for reflecting the interference level from the first UE 602 back to the network device 601, where receive power of the UE in the group of target UEs 603 for receiving the reference signal of the first UE 602 is above a power threshold, or the distance between the UE in the group of target UEs 603 and the first UE 602 is below a distance threshold.

In the sixth approach in which the first maximum transmit power is determined, the network device 601 configured to determine the first maximum transmit power according to the maximum interference level tolerable for the cellular network is configured:

To send resource information and predetermined transmit power of a reference signal configured for the first UE 602 to a UE in the group of target UEs 603; to obtain a path loss fed back by the UE in the group of target UEs 603; and to determine the first maximum transmit power according to the maximum interference level tolerable for the cellular network, and the path loss fed back by the UE in the group of target UEs 603, where the maximum interference level tolerable for the cellular network is the maximum interference level tolerable for the UE in the group of target UEs 603 over the downlink of the cellular network; and The UE in the group of target UEs 603 is configured to determine the path loss of the first UE 602 to the UE in the group of target UEs 603 by receiving the reference signal sent by the first UE 602, and to feed the path loss back to the network device 601, where receive power of the UE in the group of target UEs 603 for receiving the reference signal of the first UE 602 is above a power threshold, or the distance between the UE in the group of target UEs 603 and the first UE 602 is below a distance threshold.

Figure 8:
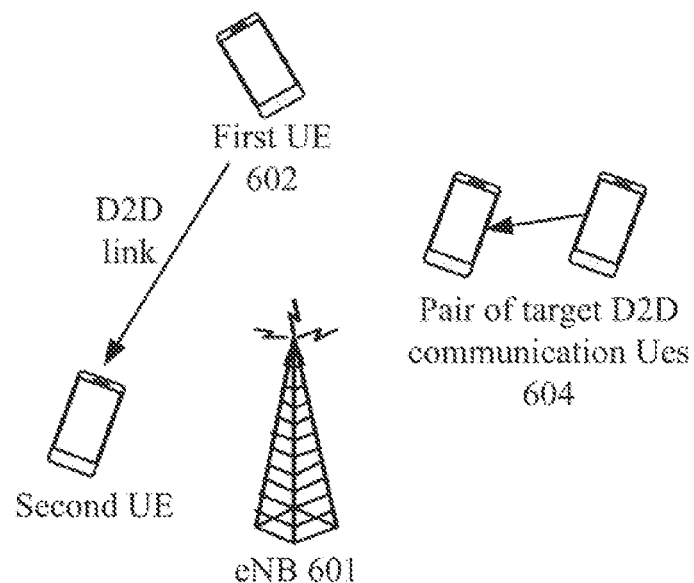
FIG. 8 illustrates a schematic structural diagram of a third system according to an embodiment of the invention.

Preferably as illustrated in FIG. 8, the system further includes a pair of target D2D communication UEs 604, and the network device configured to determine the second maximum transmit power according to the maximum allowable interference level of the first UE to the other receiving UE is configured:

To determine the second maximum transmit power according to the maximum allowable interference level of the first UE to a receiving UE in the pair of target D2D communication UEs, and a parameter fed back by the receiving UE in the pair of target D2D communication UEs for reflecting the interference level from the first UE 602, where the maximum allowable interference level of the first UE to the other receiving UE is the maximum allowable interference level of the first UE to the receiving UE in the pair of target D2D communication UEs; and the pair of target D2D communication UEs conducts D2D communication over the same cellular network resource as the first UE 602, and the receive power thereof for receiving the reference signal of the first UE is above a power threshold, or the pair of target D2D communication UEs conducts D2D communication over the same cellular network resource as the first UE, and the distance thereof from the first UE is below a distance threshold.

Preferably, the system further includes a pair of target D2D communication UEs 604, and the network device configured to determine the second maximum transmit power according to the maximum allowable interference level of the first UE to the other receiving UE is configured:

To send resource information of a reference signal configured for the first UE 602 to the receiving UE in the pair of target D2D communication UEs 604; to obtain the parameter fed back by the receiving UE in the pair of target D2D communication UEs 604 for reflecting the interference level from the first UE 602, where the parameter for reflecting the interference level from the first UE 602 includes the receive power for receiving the reference signal sent by the first UE 602; and to determine the second maximum transmit power according to the maximum allowable interference level of the first UE 602 to the receiving UE in the pair of target D2D communication UEs 604, and the parameter fed back by the receiving UE in the pair of target D2D communication UEs 604 for reflecting the interference level from the first UE 602; and The receiving UE in the pair of target D2D communication UEs 604 is configured to determine the parameter for reflecting the interference level from the first UE 602, by receiving the reference signal sent by the first UE 602, and to send the parameter for reflecting an interference level from the first UE 602 to the network device 601, where the pair of target D2D communication UEs 604 conducts D2D communication over the same cellular network resource as the first UE, and the receive power thereof for receiving the reference signal of the first UE 602 is above a power threshold, or the pair of target D2D communication UEs 604 conducts D2D communication over the same cellular network resource as the first UE, and the distance thereof from the first UE 602 is below a distance threshold.

Preferably as illustrated in FIG. 8, the system further includes a pair of target D2D communication UEs 604, and the network device 601 configured to determine the second maximum transmit power according to the maximum allowable interference level of the first UE 602 to the other receiving UE is configured:

To configure the receiving UE in the pair of target D2D communication UEs 604 with a zero-power reference signal; to send resource information of the zero-power reference signal to the receiving UE; to obtain the parameter fed back by the receiving UE for reflecting the interference level from the first UE, where the parameter for reflecting the interference level from the first UE includes the receive power over a resource of the zero-power reference signal, or channel quality information derived from the receive power over the resource of the zero-power reference signal; and to determine the second maximum transmit power according to the maximum allowable interference level of the first UE 602 to the receiving UE in the pair of target D2D communication UEs, and the parameter fed back by the receiving UE in the pair of target D2D communication UEs 604 for reflecting the interference level from the first UE; and The receiving UE in the pair of target D2D communication UEs 604 is configured to determine the parameter for reflecting the interference level from the first UE 602, according to the receive power over the resource of the zero-power reference signal, and to send the parameter for reflecting the interference level from the first UE to the network device, where the pair of target D2D communication UEs 604 conducts D2D communication over the same cellular network resource as the first UE, and the receive power thereof for receiving the reference signal of the first UE 602 is above a power threshold, or the pair of target D2D communication UEs 604 conducts D2D communication over the same cellular network resource as the first UE, and the distance thereof of from the first UE 602 is below a distance threshold.

Preferably as illustrated in FIG. 8, the system further includes a pair of target D2D communication UEs 604, and the network device 601 configured to determine the second maximum transmit power according to the maximum allowable interference level of the first UE 602 to the other receiving UE is configured:

To send resource information and predetermined transmit power of a reference signal configured for the first UE 602 to a receiving UE in the pair of target D2D communication UEs; to obtain a path loss fed back by the receiving UE; and to determine the second maximum transmit power according to the maximum allowable interference level of the first UE 602 to the receiving UE in the pair of target D2D communication UEs 604, and the path loss fed back by the receiving UE in the pair of target D2D communication UEs 604; and The receiving UE in the pair of target D2D communication UEs 604 is configured to determine the path loss of the first UE 602 to the receiving UE, by receiving the reference signal sent by the first UE 602, and to send the path loss to the network device 601, where the pair of target D2D communication UEs 604 conducts D2D communication over the same cellular network resource as the first UE 602, and the receive power thereof for receiving the reference signal of the first UE 602 is above a power threshold, or the pair of target D2D communication UEs 604 conducts D2D communication over the same cellular network resource as the first UE, and the distance thereof from the first UE 602 is below a distance threshold.

Preferably as illustrated in FIG. 6, the system further includes a second UE 605 configured:

To send a path loss of the first UE 602 to the second UE 605, and a parameter for reflecting the interference level and the noise level of the second UE 605 to the network device 601, where the second UE 605 is the receiving UE, which receives data of the first UE in D2D communication;

The network device 601 is further configured to obtain the path loss of the first UE 602 to the second UE 605, and the parameter for reflecting the interference level and the noise level of the second UE 605 to the network device 601; to determine target transmit power of the first UE 602 according to the path loss of the first UE 602 to the second UE 605, and the parameter for reflecting the interference level and the noise level of the second UE 605, and to send the target transmit power to the first UE 602; and The first UE 602 configured to determine the transmit power is configured to determine the transmit power in D2D communication according to the maximum allowable transmit power and the target transmit power.

Preferably as illustrated in FIG. 6, the system further includes a second UE 605 configured:

To send a parameter for reflecting the interference level and the noise level of the second UE 605 to the first UE 602, where the second UE 605 is the receiving UE, which receives data of the first UE in D2D communication;

The first UE 602 is further configured to determine target transmit power of the first UE 602 in D2D communication according to a determined path loss of the first UE 602 to the second UE 605 and the parameter for reflecting the interference level and the noise level of the second UE 605; and The first UE 602 configured to determine the transmit power is configured to determine the transmit power in D2D communication according to the maximum allowable transmit power and the target transmit power.

Preferably as illustrated in FIG. 6, the system further includes a second UE 605 configured:

To receive a reference signal, and transmit power of the reference signal, sent by the first UE 602, to determine target transmit power of the first UE 602 in D2D communication according to the receive power and the transmit power of the reference signal, and to send the target transmit power to the first UE 602, where the second UE 605 is a receiving UE, which receives data of the first UE in D2D communication; and The first UE 602 configured to determine the transmit power is configured to determine the transmit power in D2D communication according to the maximum allowable transmit power and the target transmit power.

Further to any one of the embodiments above of the system, preferably the network device 601 is further configured to obtain D2D communication quality information between the first UE 602 and the second UE 605, where the second UE 605 is a UE receiving data of the first UE in D2D communication; to determine a step length by close-loop adjustment for the transmit power of the first UE 602 in D2D communication according to the D2D communication quality information; and to send the step length by close-loop adjustment to the first UE 602; and The first UE 602 is further configured to receive the step length by close-loop adjustment, and to adjust the determined transmit power in D2D communication according to the step length by close-loop adjustment.

Figure 9:
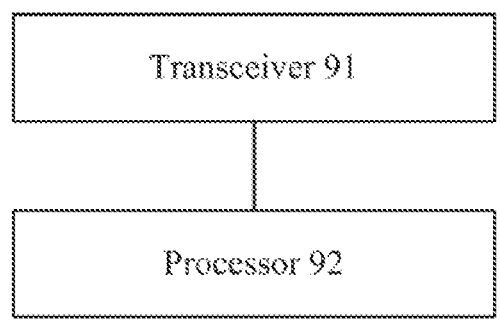
FIG. 9 illustrates a schematic structural diagram of another network device according to an embodiment of the invention.

The structure and process of the network device according to the embodiment of the invention will be described below with respect to a preferred hardware structure thereof. Referring to FIG. 9, the network device includes a transceiver 91, and at least one processor 92 connected with the transceiver 91, where:

The processor 92 is configured to determine the maximum allowable transmit power for a first UE according to the maximum interference level tolerable for a cellular network and/or the maximum allowable interference level of the first UE to another receiving UE, where the first UE is a transmitting UE in D2D communication, and the other receiving UE is other than a receiving UE in D2D communication in which the first UE participates; and The transceiver 91 is configured to send the maximum allowable transmit power for the first UE to the first UE, so that the first UE determines transmit power in D2D communication according to the maximum allowable transmit power.

Reference can be made to the implementation of the method above at the network device side for the same or similar technical features of the embodiment of the network device according to the invention as or to those of the method at the network device side, so a repeated description thereof will be omitted here.

Preferably the processor 92 is configured to determine first maximum transmit power according to the maximum interference level tolerable for the cellular network, and to determine the first maximum transmit power as the maximum allowable transmit power for the first UE; or to determine second maximum transmit power according to the maximum allowable interference level of the first UE to the other receiving UE, and to determine the second maximum transmit power as the maximum allowable transmit power for the first UE; or to determine first maximum transmit power according to the maximum interference level tolerable for the cellular network, to determine second maximum transmit power according to the maximum allowable interference level of the first UE to the other receiving UE, and to select the smaller one of the first maximum transmit power and the second maximum transmit power as the maximum allowable transmit power for the first UE.

Preferably if the first UE transmits D2D data over an uplink resource of the cellular network, then the processor 92 configured to determine the first maximum transmit power according to the maximum interference level tolerable for the cellular network is configured to determine the first maximum transmit power according to useful signal power to be received over the uplink resource, an uplink path loss of the first UE to the network device, and the maximum interference level tolerable for the cellular network, where the maximum interference level tolerable for the cellular network is the maximum interference level tolerable for the uplink of the cellular network.

Preferably if the first UE transmits D2D data over an uplink resource of the cellular network, then before the first maximum transmit power is determined according to the maximum interference level tolerable for the cellular network, the processor 92 is further configured to receive an uplink channel and/or an uplink signal, sent by the first UE over the cellular network, with transmit power to be defined by the network device, and to determine the uplink path loss of the first UE to the network device according to the uplink channel and/or the uplink signal.

Preferably if the first UE transmits D2D data over an uplink resource of the cellular network, then before the first maximum transmit power is determined according to the maximum interference level tolerable for the cellular network, the transceiver 91 is further configured to send a downlink reference signal to the first UE, and to receive the receive power of the downlink reference signal, reported by the first UE; and the processor 92 is further configured to determine a downlink path loss of the network device to the first UE according to the receive power received by the transceiver 91, and to determine the downlink path loss of the network device to the first UE as the uplink path loss of the first UE to the network device.

Preferably if the first UE transmits D2D data over an uplink resource of the cellular network, then before the first maximum transmit power is determined according to the maximum interference level tolerable for the cellular network, the transceiver 91 is further configured to receive a downlink path loss of the network device to the first UE, reported by the first UE; and the processor 92 is further configured to determine the downlink path loss of the network device to the first UE as the uplink path loss of the first UE to the network device.

Preferably if the first UE transmits D2D data over a downlink resource of the cellular network, then the processor 92 configured to determine the first maximum transmit power according to the maximum interference level tolerable for the cellular network is configured:

To determine the first maximum transmit power according to the maximum interference level tolerable for the cellular network, and a parameter fed back by a UE in a group of target UEs for reflecting the interference level from the first UE, where the maximum interference level tolerable for the cellular network is the maximum interference level tolerable for the UE in the group of target UEs over the downlink of the cellular network, and the receive power of the UE in the group of target UEs for receiving a reference signal of the first UE is above a power threshold, or the distance between the UE in the group of target UEs and the first UE is below a distance threshold.

Preferably if the first UE transmits D2D data over a downlink resource of the cellular network, then before the first maximum transmit power is determined according to the maximum interference level tolerable for the cellular network, the transceiver 91 is further configured:

To send resource information of a reference signal configured for the first UE to a UE in a group of target UEs, so that the UE in the group of target UEs determines the parameter for reflecting the interference level from the first UE, by receiving the reference signal sent by the first UE, where the receive power of the UE in the group of target UEs for receiving the reference signal of the first UE is above a power threshold, or the distance between the UE in the group of target UEs and the first UE is below a distance threshold.

Preferably if the first UE transmits D2D data over a downlink resource of the cellular network, then before the first maximum transmit power is determined according to the maximum interference level tolerable for the cellular network, the processor 92 is further configured to configure a group of target UEs with a zero-power reference signal; and The transceiver 91 is further configured to send resource information of the zero-power reference signal to the UE in the group of target UEs, so that the UE in the group of target UEs determines the parameter for reflecting the interference level from the first UE according to the receive power over a resource of the zero-power reference signal; and to obtain the parameter fed back by the UE in the group of target UEs for reflecting the interference level from the first UE;

The receive power of the UE in the group of target UEs for receiving the reference signal of the first UE is above a power threshold, or the distance between the UE in the group of target UEs and the first UE is below a distance threshold; and the parameter for reflecting the interference level from the first UE includes the receive power over the resource of the zero-power reference signal, or channel quality information derived from the receive power over the resource of the zero-power reference signal.

Preferably if the first UE transmits D2D data over a downlink resource of the cellular network, then when the first maximum transmit power is determined according to the maximum interference level tolerable for the cellular network, the transceiver 91 is configured to send resource information and predetermined transmit power of a reference signal configured for the first UE to a UE in a group of target UEs, so that the UE in the group of target UEs determines a path loss of the first UE to the UE in the group of target UEs by receiving the reference signal sent by the first UE; and to obtain the path loss fed back by the UE in the group of target UEs; and The processor 92 is configured to determine the first maximum transmit power according to the maximum interference level tolerable for the cellular network and the path loss fed back by the UE in the group of target UEs;

The receive power of the UE in the group of target UEs for receiving the reference signal of the first UE is above a power threshold, or the distance between the UE in the group of target UEs and the first UE is below a distance threshold; and the maximum interference level tolerable for the cellular network is maximum interference level tolerable for the UE in the group of target UEs in the downlink of the cellular network.

Preferably the processor 92 configured to determine the second maximum transmit power according to the maximum allowable interference level of the first UE to the other receiving UE is configured to determine the second maximum transmit power according to the maximum allowable interference level of the first UE to a receiving UE in a pair of target D2D communication UEs, and a parameter fed back by the receiving UE in the pair of target D2D communication UEs for reflecting an interference level from the first UE;

The maximum allowable interference level of the first UE to the other receiving UE is the maximum allowable interference level of the first UE to the receiving UE in the pair of target D2D communication UEs; and the pair of target D2D communication UEs conducts D2D communication over the same cellular network resource as the first UE, and the receive power to receive the reference signal thereof of the first UE is above a power threshold, or the pair of target D2D communication UEs conducts D2D communication over the same cellular network resource as the first UE, and the distance thereof of from the first UE is below a distance threshold.

Preferably the processor 92 configured to determine the second maximum transmit power according to the maximum allowable interference level of the first UE to the other receiving UE is configured to send resource information of a reference signal configured for the first UE to a receiving UE in a pair of target D2D communication UEs, so that the receiving UE in the pair of target D2D communication UEs determines the parameter for reflecting the interference level from the first UE, by receiving the reference signal sent by the first UE; and to obtain the parameter fed back by the receiving UE in the pair of target D2D communication UEs to reflect an interference level from the first UE, where the parameter for reflecting the interference level from the first UE includes the receive power for receiving the reference signal sent by the first UE.

Preferably the processor 92 configured to determine the second maximum transmit power according to the maximum interference level of the first UE allowable for the other receiving UE is configured to configure the receiving UE in the pair of target D2D communication UEs with a zero-power reference signal, and the transceiver 91 is configured to send resource information of the zero-power reference signal to the receiving UE so that the receiving UE in the pair of target D2D communication UEs determines the parameter for reflecting an interference level from the first UE, according to the receive power over a resource of the zero-power reference signal; and to obtain the parameter fed back by the receiving UE for reflecting the interference level from the first UE, where the parameter for reflecting the interference level from the first UE includes the receive power over the resource of the zero-power reference signal, or channel quality information derived from the receive power over the resource of the zero-power reference signal.

Preferably when the second maximum transmit power is determined according to the maximum allowable interference level of the first UE for the other receiving UE, the transceiver 91 is configured to send resource information and predetermined transmit power of a reference signal configured for the first UE to a receiving UE in a pair of target D2D communication UEs so that the receiving UE determines a path loss of the first UE to the receiving UE by receiving the reference signal sent by the first UE; and to obtain the path loss fed back by the receiving UE; and The processor 92 is configured to determine the second maximum transmit power according to the maximum allowable interference level of the first UE to the receiving UE in the pair of target D2D communication UEs, and the path loss fed back by the receiving UE in the pair of target D2D communication UE;

The pair of target D2D communication UEs conducts D2D communication over the same cellular network resource as the first UE, and the receive power to receive the reference signal thereof of the first UE is above a power threshold, or the pair of target D2D communication UEs conducts D2D communication over the same cellular network resource as the first UE, and the distance thereof of from the first UE is below a distance threshold;

Preferably the transceiver 91 is further configured to obtain a path loss of the first UE to a second UE, and a parameter for reflecting the interference level and the noise level of the second UE, where the second UE is the receiving UE which receives data of the first UE in D2D communication; the processor 92 is further configured to determine a target transmit power of the first UE according to the path loss of the first UE to the second UE, and the parameter for reflecting the interference level and the noise level of the second UE; and the transceiver 91 is further configured to send the target transmit power to the first UE.

Preferably the maximum allowable transmit power for the first UE and the target transmit power of the first UE in D2D communication are included in operating point information for transmit power in D2D communication, sent by the network node to the first UE.

Further to any one of the embodiments above of the network device, the transceiver 91 is further configured to obtain D2D communication quality information between the first UE and a second UE, the second UE is the receiving UE which receives data of the first UE in D2D communication; the processor 92 is further configured to determine a step length by close-loop adjustment for transmit power of the first UE in D2D communication according to the D2D communication quality information; and transceiver 91 is further configured to send the step length by close-loop adjustment to the first UE.

Figure 10:
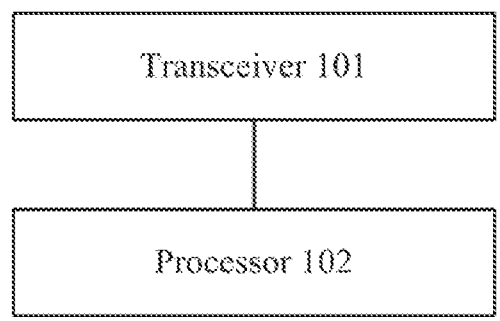
FIG. 10 illustrates a schematic structural diagram of another first UE according to an embodiment of the invention.

The structure and process of the transmitting UE (i.e., the first UE) according to the embodiment of the invention will be described below with respect to a preferred hardware structure thereof. Referring to FIG. 10, the transmitting UE includes a transceiver 101, and at least one processor 102 connected with the transceiver 101, where:

The transceiver 101 is configured to receive the maximum allowable transmit power for the first UE, sent by a network device, where the maximum allowable transmit power for the first UE is determined according to the maximum interference level tolerable for a cellular network and/or the maximum allowable interference level of the transmitting UE to another receiving UE other than a receiving UE in D2D communication in which the transmitting UE participates; and The processor 102 is configured to determine transmit power in D2D communication according to the maximum allowable transmit power.

Reference can be made to the implementation of the method above at the network device side for the same or similar technical features of the embodiment of the transmitting UE according to the invention as or to those of the method at the network device side and the method at the first UE side, so a repeated description thereof will be omitted here.

Preferably the transceiver 101 is configured to obtain a parameter, sent by the receiving UE participating in D2D communication with the transmitting UE, for reflecting an interference level and a noise level of the receiving UE; and the processor 102 is configured to determine target transmit power in D2D communication according to a determined path loss of the transmitting UE to the receiving UE, and the parameter for reflecting the interference level and the noise level of the receiving UE; and to determine the transmit power in D2D communication according to the maximum allowable transmit power and the target transmit power.

Preferably the transceiver 101 is further configured to receive a reference signal sent by the receiving UE at predetermined transmit power; and the processor 102 is further configured to determine a path loss of the receiving UE to the transmitting UE according to receive power for receiving the reference signal, and the predetermined transmit power, and to determine the path loss as the path loss of the transmitting UE to the receiving UE.

Preferably the transceiver 101 is further configured to send a reference signal and transmit power of the reference signal to the receiving UE participating in D2D communication with the transmitting UE, so that the receiving UE determines target transmit power of the transmitting UE in D2D communication according to receive power and the transmit power of the reference signal; and to receive the target transmit power of the transmitting UE in D2D communication, fed back by the receiving UE; and the processor 102 is configured to determine the transmit power in D2D communication according to the maximum allowable transmit power and the target transmit power.

Preferably the transceiver 101 is further configured to receive a step length by close-loop adjustment sent by the network device; and the processor 102 is further configured to adjust the determined transmit power in D2D communication according to the step length by close-loop adjustment.

Preferably the processor 102 is configured to determine the transmit power in the equation of:

$$P_{A\text{-}D2D} = \min((P_{Tmax} - P_A), P_{A\text{-}D2D\text{-}max}, (P_{o\text{-}A\text{-}B} + PL_{A\text{-}B} + D_{MCS} + 10 \lg M + \delta))$$

Where $P_{A\text{-}D2D}$ represents the transmit power of the first UE in D2D communication; $P_{Tmax}$ represents the maximum transmit power supported by the transmitting UE; and if the transmitting UE further conducts cellular communication over a different resource, then $P_A$ represents uplink transmit power of the transmitting UE in cellular communication; otherwise, $P_A=0$; $P_{o\text{-}A\text{-}B}$ represents the target transmit power of the transmitting UE in D2D communication; $P_{A\text{-}D2D\text{-}max}$ represents the maximum allowable transmit power for the transmitting UE; $PL_{A\text{-}B}$ represents the path loss of the transmitting UE to the receiving UE; $D_{MCS}$ represents a Modulation and Coding Scheme (MCS) level parameter; M represents a bandwidth; and $\delta$ represents the step length by close-loop adjustment.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for controlling transmit power in Device to Device (D2D) communication, the method comprising:
    determining, by a network device, a maximum allowable transmit power for a first UE according to a maximum interference level tolerable for a cellular network and/or a maximum allowable interference level of the first UE to another receiving UE, wherein the first UE is a transmitting UE in D2D communication, and the another receiving UE is other than a receiving UE in D2D communication in which the first UE participates;
    sending, by the network device, the maximum allowable transmit power for the first UE to the first UE so that the first UE determines transmit power in D2D communication according to the maximum allowable transmit power; and
    determining, by the network device, a step length by close-loop adjustment for transmit power of the first UE in D2D communication, and to send the step length by the close-loop adjustment to the first UE so that the first UE adjusts the determined transmit power in D2D communication according to the step length by close-loop adjustment;
    wherein the first UE determines the transmit power in D2D communication in the equation of:

$P_{A-D2D} = \min((P_{Tmax}P_A), P_{A-D2D-max}, (P_{o-A-B} + PL_{A-B} + D_{MCS} + 10 \lg M + \delta))$, wherein $P_{A-D2D}$ represents the transmit power of the first UE in D2D communication; $P_{Tmax}$ represents the maximum transmit power supported by the first UE; and if the first UE further conducts cellular communication over a different resource, then $P_A$ represents uplink transmit power of the first UE in cellular communication; otherwise, $P_A = 0$; $P_{o-A-D}$ represents the target transmit power of the first UE in D2D communication; $P_{A-D2D-max}$ represents the maximum allowable transmit power for the first UE; $PL_{A-B}$ represents the path loss of the first UE to the second UE; $D_{MCS}$ represents a Modulation and Coding Scheme (MCS) level parameter; M represents a bandwidth; and $\delta$ represents the step length by close-loop adjustment.

2. The method according to claim 1, wherein the determining, by the network device, the maximum allowable transmit power for the first UE to the first UE comprises:
    determining, by the network device, first maximum transmit power according to the maximum interference level tolerable for the cellular network, and determining the first maximum transmit power as the maximum allowable transmit power for the first UE; or
    determining, by the network device, second maximum transmit power according to the maximum interference level of the first UE tolerable for the other receiving UE, and determining the second maximum transmit power as the maximum allowable transmit power for the first UE; or
    determining, by the network device, first maximum transmit power according to the maximum interference level tolerable for the cellular network, determining second maximum transmit power according to the maximum allowable interference level of the first UE to the other receiving UE, and selecting a smaller one of the first maximum transmit power and the second maximum transmit power as the maximum allowable transmit power for the first UE.

3. The method according to claim 2, wherein if the first UE transmits D2D data over an uplink resource of the cellular network, then determining, by the network device, the first maximum transmit power according to the maximum interference level tolerable for the cellular network comprises:
    determining, by the network device, the first maximum transmit power according to useful signal power to be received over the uplink resource, an uplink path loss of the first UE to the network device, and the maximum interference level tolerable for the cellular network, wherein the maximum interference level tolerable for the cellular network is the maximum interference level tolerable for the uplink of the cellular network.

4. The method according to claim 3, wherein before the network device determines the first maximum transmit power according to the maximum interference level tolerable for the cellular network, the method further comprises:
    receiving, by the network device, an uplink channel and/or an uplink signal, sent by the first UE over the cellular network, with transmit power to be defined by the network device, and determining the uplink path loss of the first UE to the network device according to the uplink channel and/or the uplink signal;
    or,
    before the network device determines the first maximum transmit power according to the maximum interference level tolerable for the cellular network, the method further comprises:
    sending, by the network device, a downlink reference signal to the first UE, receiving receive power of the downlink reference signal reported by the first UE, determining a downlink path loss of the network device to the first UE according to the receive power, and determining the downlink path loss of the network device to the first UE as the uplink path loss of the first UE to the network device;
    or,
    before the network device determines the first maximum transmit power according to the maximum interference level tolerable for the cellular network, the method further comprises:

receiving, by the network device, a downlink path loss of the network device to the first UE, reported by the first UE; and determining, by the network device, the downlink path loss of the network device to the first UE as the uplink path loss of the first UE to the network device.

5. The method according to claim 2, wherein if the first UE transmits D2D data over a downlink resource of the cellular network, then determining, by the network device, the first maximum transmit power according to the maximum interference level tolerable for the cellular network comprises:

determining, by the network device, the first maximum transmit power according to the maximum interference level tolerable for the cellular network and a parameter fed back by a UE in a group of target UEs for reflecting an interference level from the first UE, wherein the maximum interference level tolerable for the cellular network is the maximum interference level tolerable for the UE in the group of target UEs over the downlink of the cellular network, and receive power of the UE in the group of target UEs for receiving a reference signal of the first UE is above a power threshold, or the distance between the UE in the group of target UEs and the first UE is below a distance threshold.

6. The method according to claim 5, wherein before the network device determines the first maximum transmit power according to the maximum interference level tolerable for the cellular network, the method further comprises:

sending, by the network device, resource information of a reference signal configured for the first UE to the UE in the group of target UEs, so that the UE in the group of target UEs determines the parameter for reflecting the interference level from the first UE, by receiving the reference signal sent by the first UE; and obtaining, by the network device, the parameter fed back by the UE in the group of target UEs for reflecting the interference level from the first UE, wherein the parameter for reflecting the interference level from the first UE comprises the receive power for receiving the reference signal sent by the first UE;

or, before the network device determines the first maximum transmit power according to the maximum interference level tolerable for the cellular network, the method further comprises:

configuring, by the network device, the group of target UEs with a zero-power reference signal, and sending resource information of the zero-power reference signal to the UE in the group of target UEs, so that the UE in the group of target UEs determines the parameter for reflecting the interference level from the first UE according to receive power over a resource of the zero-power reference signal; and obtaining, by the network device, the parameter fed back by the UE in the group of target UEs for reflecting the interference level from the first UE, wherein the parameter for reflecting the interference level from the first UE comprises the receive power over the resource of the zero-power reference signal, or channel quality information derived from the receive power over the resource of the zero-power reference signal.

7. The method according to claim 2, wherein if the first UE transmits D2D data over a downlink resource of the cellular network, then determining, by the network device, the first maximum transmit power according to the maximum interference level tolerable for the cellular network comprises:

sending, by the network device, resource information and predetermined transmit power of a reference signal configured for the first UE to a UE in a group of target UEs, so that the UE in the group of target UEs determines a path loss of the first UE to the UE in the group of target UEs by receiving the reference signal sent by the first UE, wherein receive power of the UE in the group of target UEs for receiving the reference signal of the first UE is above a power threshold, or the distance between the UE in the group of target UEs and the first UE is below a distance threshold;

obtaining, by the network device, the path loss fed back by the UE in the group of target UEs; and determining, by the network device, the first maximum transmit power according to the maximum interference level tolerable for the cellular network and the path loss fed back by the UE in the group of target UEs, wherein the maximum interference level tolerable for the cellular network is maximum interference level tolerable for the UE in the group of target UEs over the downlink of the cellular network.

8. The method according to claim 2, wherein determining, by the network device, the second maximum transmit power according to the maximum allowable interference level of the first UE to the other receiving UE comprises:

determining, by the network device, the second maximum transmit power according to the maximum allowable interference level of the first UE to a receiving UE in a pair of target D2D communication UEs, and a parameter fed back by the receiving UE in the pair of target D2D communication UEs for reflecting an interference level from the first UE, wherein the maximum allowable interference level of the first UE to the other receiving UE is the maximum allowable interference level of the first UE to the receiving UE in the pair of target D2D communication UEs; and the pair of target D2D communication UEs conducts D2D communication over the same cellular network resource as the first UE, and receive power thereof for receiving the reference signal of the first UE is above a power threshold, or, the pair of target D2D communication UEs conducts D2D communication over the same cellular network resource as the first UE, and the distance thereof from the first UE is below a distance threshold.

9. The method according to claim 8, wherein before the network device determines the second maximum transmit power according to the maximum allowable interference level of the first UE to the other receiving UE, the method further comprises:

sending, by the network device, resource information of the reference signal configured for the first UE to the receiving UE in the pair of target D2D communication UEs, so that the receiving UE in the pair of target D2D communication UEs determines the parameter for reflecting the interference level from the first UE, by receiving the reference signal sent by the first UE; and obtaining, by the network device, the parameter fed back by the receiving UE in the pair of target D2D communication UEs for reflecting the interference level from the first UE, wherein the parameter for reflecting the interference level from the first UE comprises receive power for receiving the reference signal sent by the first UE;

or,
before the network device determines the second maximum transmit power according to the maximum allowable interference level of the first UE to the other receiving UE, the method further comprises:
configuring, by the network device, the receiving UE in the pair of target D2D communication UEs with a zero-power reference signal, and sending resource information of the zero-power reference signal to the receiving UE, so that the receiving UE in the pair of target D2D communication UEs determines the parameter for reflecting the interference level from the first UE, according to receive power over the resource of the zero-power reference signal; and
obtaining, by the network device, the parameter fed back by the receiving UE for reflecting the interference level from the first UE, wherein the parameter for reflecting the interference level from the first UE comprises the receive power over the resource of the zero-power reference signal, or channel quality information derived from the receive power over the resource of the zero-power reference signal.

10. The method according to claim 2, wherein determining, by the network device, the second maximum transmit power according to the maximum allowable interference level of the first UE to the other receiving UE comprises:
sending, by the network device, resource information and predetermined transmit power of the reference signal configured for the first UE to a receiving UE in a pair of target D2D communication UEs, so that the receiving UE determines a path loss of the first UE to the receiving UE by receiving the reference signal sent by the first UE, wherein the pair of target D2D communication UEs conducts D2D communication over the same cellular network resource as the first UE, and receive power thereof for receiving the reference signal of the first UE is above a power threshold, or the pair of target D2D communication UEs conducts D2D communication over the same cellular network resource as the first UE, and the distance thereof from the first UE is below a distance threshold;
obtaining, by the network device, the path loss fed back by the receiving UE; and
determining, by the network device, the second maximum transmit power according to the maximum allowable interference level of the first UE to the receiving UE in the pair of target D2D communication UEs and the path loss fed back by the receiving UE in the pair of target D2D communication UEs.

11. The method according to claim 1, wherein the method further comprises:
obtaining, by the network device, a path loss of the first UE to a second UE, and a parameter for reflecting an interference level and a noise level of the second UE, wherein the second UE is the receiving UE, which receives data of the first UE in D2D communication; and
determining, by the network device, a target transmit power of the first UE according to the path loss of the first UE to the second UE, and the parameter for reflecting the interference level and the noise level of the second UE;
sending, by the network device, the target transmit power to the first UE.

12. The method according to claim 1, wherein determining, by the network device, a step length by close-loop adjustment for transmit power of the first UE in D2D communication comprises:
obtaining, by the network device, D2D communication quality information between the first UE and a second d UE which is the receiving UE receiving data of the first UE in D2D communication; and
determining, by the network device, a step length by close-loop adjustment for transmit power of the first UE in D2D communication according to the D2D communication quality information.

13. A method for controlling transmit power in D2D communication, the method comprising:
receiving, by a first UE which is a transmitting UE in D2D communication, a maximum allowable transmit power for the first UE, sent by a network device, wherein the maximum allowable transmit power for the first UE is determined according to a maximum interference level tolerable for a cellular network and/or a maximum allowable interference level of the transmitting UE to another receiving UE other than a receiving UE in D2D communication in which the transmitting UE participates;
determining, by the first UE, transmit power in D2D communication according to the maximum allowable transmit power;
receiving, by the first UE, a step length by close-loop adjustment sent by the network device; and
adjusting, by the first UE, the determined transmit power in D2D communication according to the step length by close-loop adjustment;
wherein the first UE determines the transmit power in D2D communication in the equation of:

$$P_{A\text{-}D2D}=\min((P_{Tmax}-P_A),P_{A\text{-}D2D\text{-}max},(P_{o\text{-}A\text{-}B}+PL_{A\text{-}B}+D_{MCS}+10\lg M+\delta)),$$

wherein $P_{PA\text{-}D2D}$ represents the transmit power of the first UE in D2D communication; $P_{Tmax}$ represents the maximum transmit power supported by the first UE; and if the first UE further conducts cellular communication over a different resource, then $P_A$ represents uplink transmit power of the first UE in cellular communication; otherwise $P_A=0$, $P_{o\text{-}A\text{-}B}$ represents the target transmit power of the first UE in D2D communication; $P_{A\text{-}D2D\text{-}max}$ represents the maximum allowable transmit power for the first UE; $PL_{A\text{-}B}$ represents the path loss of the first UE to the second UE; $P_{MCS}$ represents a Modulation and Coding Scheme (MCS) level parameter; M represents a bandwidth; and $\delta$ represents the step length by close-loop adjustment.

14. The method according to claim 13, wherein the method further comprises:
obtaining, by the first UE, a parameter for reflecting an interference level and a noise level of a second UE which is the receiving UE receiving data of the first UE in D2D communication; and
determining, by the first UE, target transmit power in D2D communication according to a determined path loss of the first UE to the second UE and the parameter for reflecting the interference level and the noise level of the second UE; and
determining, by the first UE, the transmit power in D2D communication comprises:
determining, by the first UE, the transmit power in D2D communication according to the maximum allowable transmit power and the target transmit power.

15. The method according to claim 14, wherein the method further comprises:

receiving, by the first UE, a reference signal sent by the second UE at predetermined transmit power, determining a path loss of the second UE to the first UE according to receive power for receiving the reference signal and the predetermined transmit power, and determining the path loss as the path loss of the first UE to the second UE.

16. The method according to claim 13, wherein the method further comprises:

sending, by the first UE, a reference signal and transmit power of the reference signal to a second UE, so that the second UE determines target transmit power of the first UE in D2D communication according to receive power and the transmit power of the reference signal, wherein the second UE is the receiving UE receiving data of the first UE in D2D communication; and receiving, by the first UE, the target transmit power of the first UE in D2D communication, fed back by the second UE; and determining, by the first UE, the transmit power in D2D communication comprises:

determining, by the first UE, the transmit power in D2D communication according to the maximum allowable transmit power and the target transmit power.

17. A network device, comprising:

a transceiver and at least one processor connected with the transceiver, wherein the at least one processor is configured to determine a maximum allowable transmit power for a first UE according to a maximum interference level tolerable for a cellular network and/or a maximum allowable interference level of the first UE to another receiving UE, wherein the first UE is a transmitting UE in D2D communication, and the another receiving UE is other than a receiving UE in D2D communication in which the first UE participates; and the transceiver is configured to send the maximum allowable transmit power for the first UE to the first UE so that the first UE determines transmit power in D2D communication according to the maximum allowable transmit power;

wherein the at least one processor is further configured to determine a step length by close-loop adjustment for transmit power of the first UE in D2D communication, and the transceiver is configured to send the step length by the close-loop adjustment to the first UE so that the first UE adjusts the determined transmit power in D2D communication according to the step length by close-loop adjustment;

wherein the first UE determines the transmit power in D2D communication in the equation of:

$P_{A\text{-}D2D} = \min((P_{Tmax} - P_A), P_{A\text{-}D2D\text{-}max}, (P_{o\text{-}A\text{-}B} + PL_{A\text{-}B} + D_{MCS} + 10 \lg M + \delta))$, wherein $P_{A\text{-}D2D}$ represents the transmit power of the first UE in D2D communication; $P_{Tmax}$ represents the maximum transmit power supported by the first UE; and if the first UE further conducts cellular communication over a different resource, then $P_A$ represents uplink transmit power of the first UE in cellular communication; otherwise, $P_A=0$; $P_{o\text{-}A\text{-}B}$ represents the target transmit power of the first UE in D2D communication; $P_{A\text{-}D2D\text{-}max}$ represents the maximum allowable transmit power for the first UE; $PL_{A\text{-}B}$ represents the path loss of the first UE to the second UE; $D_{MCS}$ represents a Modulation and Coding Scheme (MCS) level parameter: M represents a bandwidth; and $\delta$ represents the step length by close-loop adjustment.

18. A transmitting UE in D2D communication, comprising:

a transceiver and at least one processor connected with the transceiver, wherein the transceiver is configured to receive a maximum allowable transmit power for the transmitting UE, sent by a network device, wherein the maximum allowable transmit power for the transmitting UE is determined according to a maximum interference level tolerable for a cellular network and/or a maximum allowable interference level of the transmitting UE to another receiving UE other than a receiving UE in D2D communication in which the transmitting UE participates; and the at least one processor is configured to determine transmit power in D2D communication according to the maximum allowable transmit power;

wherein the transceiver is further configured to receive a step length by close-loop adjustment sent by the network device, and the at least one processor is configured to adjust the determined transmit power in D2D communication according to the step length by close-loop adjustment;

wherein the at least one processor is configured to determine the transmit power in D2D communication in the equation of:

$P_{A\text{-}D2D} = \min((P_{Tmax} - P_A), P_{A\text{-}D2D\text{-}max}, (P_{o\text{-}A\text{-}B} + PL_{A\text{-}B} + D_{MCS} + 10 \lg M + \delta))$, wherein $P_{A\text{-}D2D}$ represents the transmit power of the first UE in D2D communication; $P_{Tmax}$ represents the maximum transmit power supported by the first UE; and if the first UE further conducts cellular communication over a different resource, then $P_A$ represents uplink transmit power of the first UE in cellular communication; otherwise, $P_A=0$; $P_{o\text{-}A\text{-}B}$ represents the target transmit power of the first UE in D2D communication; $P_{A\text{-}D2D\text{-}max}$ represents the maximum allowable transmit power for the first UE; $PL_{A\text{-}B}$ represents the path loss of the first UE to the second UE; $D_{MCS}$ represents a Modulation and Coding Scheme (MCS) level parameter; M represents a bandwidth; and $\delta$ represents the step length by close-loop adjustment.

* * * * *

UNITED STATES PATENT AND TRADEMARK OFFICE
CERTIFICATE OF CORRECTION

PATENT NO. : 9,832,776 B2  
APPLICATION NO. : 14/782029  
DATED : November 28, 2017  
INVENTOR(S) : Ying Peng Page 1 of 1

It is certified that error appears in the above-identified patent and that said Letters Patent is hereby corrected as shown below:

In the Claims

Column 31, Lines 54-55:  
The equation in Claim 1 should be replaced with the following equation:  
$P_{A\text{-}D2D} = \min((P_{Tmax}-P_A), P_{A\text{-}D2D\text{-}max}, (P_{o\text{-}A\text{-}B} + PL_{A\text{-}B}+D_{MCS}+10\lg M+\delta))$ Signed and Sealed this  
Fifteenth Day of May, 2018

Andrei Iancu  
*Director of the United States Patent and Trademark Office*